(12) United States Patent
Beker et al.

(10) Patent No.: US 12,492,955 B2
(45) Date of Patent: Dec. 9, 2025

(54) DEVICES AND METHODS INVOLVING SENSING IN RESPONSE TO AN APPLIED TOUCH OR OTHER FORCE

(71) Applicant: The Board of Trustees of the Leland Stanford Junior University, Stanford, CA (US)

(72) Inventors: Levent Beker, Stanford, CA (US); Zhenan Bao, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 540 days.

(21) Appl. No.: 17/771,130

(22) PCT Filed: Oct. 23, 2020

(86) PCT No.: PCT/US2020/057192
§ 371 (c)(1),
(2) Date: Apr. 22, 2022

(87) PCT Pub. No.: WO2021/081425
PCT Pub. Date: Apr. 29, 2021

(65) Prior Publication Data
US 2022/0357225 A1    Nov. 10, 2022

Related U.S. Application Data

(60) Provisional application No. 62/925,703, filed on Oct. 24, 2019.

(51) Int. Cl.
*G01L 5/22* (2006.01)
*G01L 1/14* (2006.01)
*G01L 1/22* (2006.01)

(52) U.S. Cl.
CPC .............. *G01L 5/228* (2013.01); *G01L 1/146* (2013.01); *G01L 1/22* (2013.01)

(58) Field of Classification Search
CPC ...................................... G01L 5/228
(Continued)

(56) References Cited

U.S. PATENT DOCUMENTS 7,509,869 B2 *   3/2009   Liu ................. G01K 7/015
                                              73/756
9,281,415 B2 *   3/2016   Bao ................. G06F 3/0445
(Continued)

FOREIGN PATENT DOCUMENTS

WO     2020/014356 A1    1/2020

OTHER PUBLICATIONS

Ye, Hongye, et al. "Polyester elastomers for soft tissue engineering." Chemical Society Reviews 47.12 (2018): 4545-4580. (Year: 2018).*

(Continued)

*Primary Examiner* — Walter L Lindsay, Jr.
*Assistant Examiner* — Philip T Fadul
(74) *Attorney, Agent, or Firm* — Crawford Maunu PLLC

(57) ABSTRACT

In certain examples, methods and semiconductor structures are directed to a strain sensor integrated with a membrane substrate, a pressure sensor, and a plurality of material layers. The material layers are to integrate the strain sensor, the pressure sensor and the membrane substrate, with the pressure and strain sensors operating co-operatively to indicate, in response to a force applied to or towards the pressure sensor, characterization information of the force applied and of deformation of the membrane substrate. In a more specific example, the strain sensor and the membrane substrate are integrated with the aforesaid at least one of the material layers, and at least a portion of the pressure sensor and the (Continued)

membrane substrate are stacked to permit sensing of the force concurrently by the strain sensor and the pressure sensor.

26 Claims, 12 Drawing Sheets

(58) Field of Classification Search
USPC .................................................. 73/862.626
See application file for complete search history.

(56) References Cited

U.S. PATENT DOCUMENTS

| | | | |
|---|---|---|---|
| 9,625,330 B2* | 4/2017 | Park | G01L 1/205 |
| 10,037,098 B2* | 7/2018 | Bao | G06F 3/04144 |
| 2010/0139418 A1* | 6/2010 | Loeb | G01L 5/228 |
| | | | 73/862.046 |
| 2010/0162824 A1 | 7/2010 | Jamshidi et al. | |
| 2021/0378572 A1* | 12/2021 | Beker | A61B 5/0535 |

OTHER PUBLICATIONS

USPTO. International Search Report and Written Opinion dated Jan. 19, 2021, for parent PCT Application No. PCT/US2020/057192, 15 pages.

Boutry et al. A stretchable and biodegradable strain and pressure sensor for orthopaedic application. Nature Electronics 1: 314-321, 2018.

Beker L, Matsuhisa N, You I, Ruth SRA, Niu S, Foudeh A, Tok JB, Chen X, Bao Z. A bioinspired stretchable membrane-based compliance sensor. Proc Natl Acad Sci U S A. May 26, 2020;117(21):11314-11320, with appended Supplementary Information (14 pgs), the content of which was filed in Appendix A, with portions in Appendix B, said appendices which form part of of priority U.S. Appl. No. 62/925,703.

Tee, B. C., et al. Tunable Flexible Pressure Sensors using Microstructured Elastomer Geometries for Intuitive Electronics, Advanced Functional Materials, 24(34), 5427-5434 (2014), Abstract Only, with supporting Information, 4 pages.

Lacour, S. P., et al. Stretchable gold conductors on elastomeric substrates, Applied Physics Letters, 82(15), 2404-2406 (2003).

Liu, Y., et al. Stretchable Motion Memory Devices Based on Mechanical Hybrid Materials, Advanced Materials, 29(34), 1701780 (2017).

Reeder, J. T., Kang, T., Rains, S., & Voit, W. (2018). 3D, Reconfigurable, Multimodal Electronic Whiskers via Directed Air Assembly. Advanced Materials, 30(11), 1706733.

Park, J., Kim, J., Hong, J. et al. Tailoring force sensitivity and selectivity by microstructure engineering of multidirectional electronic skins. NPG Asia Mater 10, 163-176 (2018).

* cited by examiner

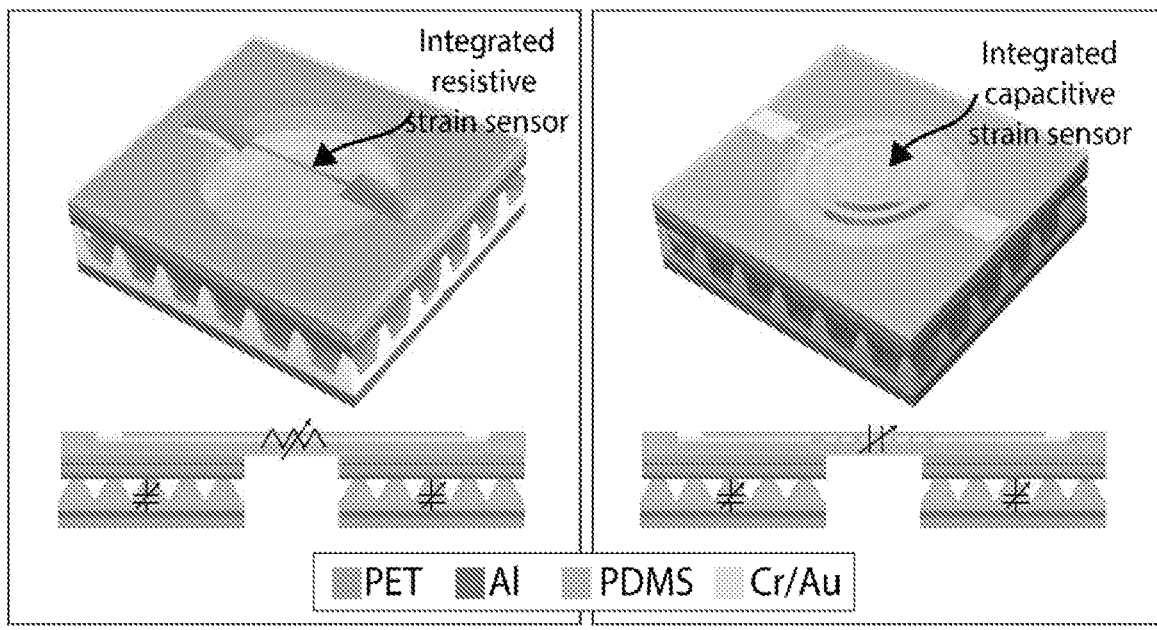
FIG. 2A
FIG. 2C
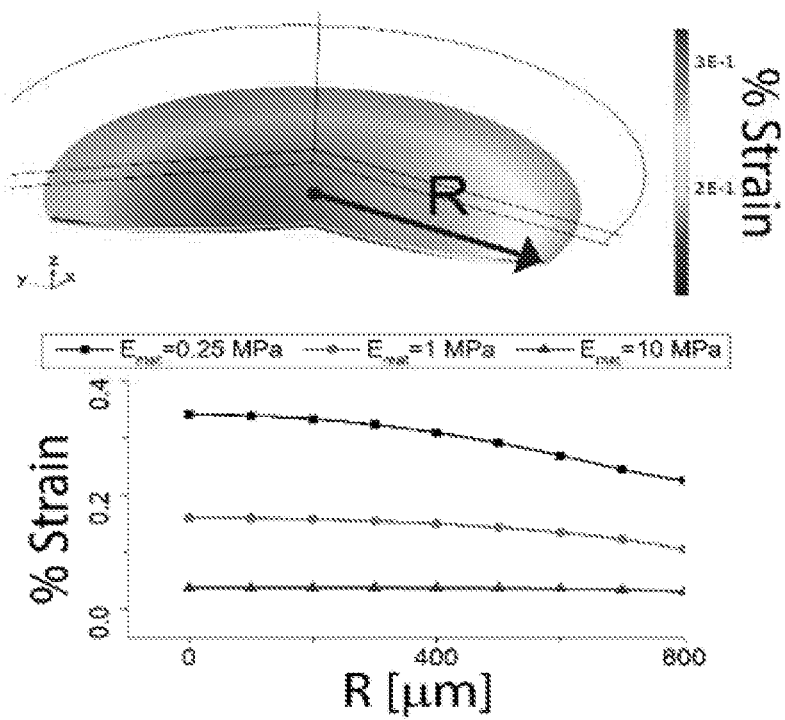
FIG. 2B

DEVICES AND METHODS INVOLVING SENSING IN RESPONSE TO AN APPLIED TOUCH OR OTHER FORCE

BACKGROUND

Aspects of the present disclosure are related generally to methods, circuits and/or materials configured and used to sense forces applied to structures including the circuits and/or materials.

Sensor apparatuses are used in a variety of devices including touch displays, industrial robotics, domestic robots (vacuuming, lawn cutting, etc.), and various types of sensing as used in healthcare applications. Such healthcare applications may include, as examples, bio-sensing cardio/pulmonary forces and tissues, surgical robots, prosthetics and robotic implants (e.g., synthetic appendages on humans and others). While many advances have been made in these applications, such robots, robotics and other types of sensing are still not a part of everyday life.

Certain types of sensing are insufficiently developed for many applications including but not limited to the types exemplified above. For example, softness sensation is a unique feature of the human skin that electronic devices have difficulty mimicking via compact and thin form-factor devices due to the complex nature of such sensing and related mechanism attempts. Further, while there have been certain efforts to implement high precision sensing devices to measure compliance of materials, in certain contexts such efforts have led to relatively bulky and/or overly-complex devices.

SUMMARY OF VARIOUS ASPECTS AND EXAMPLES

Various examples/embodiments presented by the present disclosure are directed to issues such as those addressed above and others which may become apparent from the following disclosure. For example, some of these disclosed aspects are directed to methods (of use and/or manufacture) and devices that may be used in connection with robotics, bio-sensing, and specific wearable-device applications such as prosthetic devices, pulse wave sensing for health monitoring and force sensitive mapping applications (among other material or feature-compliance sensing applications). In certain examples, these and other aspects are directed to an apparatus (e.g., systems, devices and circuitry) and/or method involving a strain sensor integrated with a membrane substrate and also involving a pressure sensor and a plurality of material layers. The material layers are to integrate the strain sensor, the pressure sensor and the membrane substrate, with the pressure and strain sensors operating cooperatively to indicate, in response to a force applied to or towards the pressure sensor, characterization information of the force applied and of deformation of the membrane substrate.

In a more specific example also according to the present disclosure, the strain sensor and the membrane substrate are integrated with the aforesaid at least one of the material layers, and at least a portion of the pressure sensor and the membrane substrate are stacked to permit sensing of the force concurrently by the strain sensor and the pressure sensor.

In another specific example, a method and/or a semiconductor device as in the apparatuses above, includes having an array of membrane structures configured for strain measurement, wherein the pressure sensing includes a microstructured-pressure sensing layer. The array of membrane structures is characterized by a certain pitch distance and is to face a surface of the microstructured pressure sensing layer for gathering compliance information from different locations of an object to apply the force. The membrane substrate may correspond to one of the membrane structures in the array.

In yet other such examples which may also build on the above-discussed aspects, methods and semiconductor-based structures as may be directed to electronic-skin-like apparatuses, and related sensing methodology, that are capable of mimicking sensing as though performed by human skin. In one such aspect concerning a method of manufacture, before using the strain sensor and the pressure sensor to respond to an applied force, the method includes a step of molding a set of patterned silicon wafers to provide a micro-structured pyramid elastomer layer, and stacking the micro-structured pyramid elastomer layer with at least some of the plurality of material layers to face the membrane substrate. The micro-structured pyramid elastomer layer may then act as a dielectric in a circuit used to sense the applied pressure.

Also in accordance with the present disclosure, exemplary aspects are directed to a thin sensor which includes a strain sensor coupled to a pressure sensor and capable of identifying compliance of touched materials. The sensor can be integrated into robotic systems due to its small form-factor. Via certain experiments using such above-characterized aspects, results show that such a sensor is capable of identifying rigid and soft materials with high sensitivity; for example, the sensor can form part of a robotic finger to demonstrate the capability of the sensor for robotics. Further, such an arrayed sensor configuration allows a softness mapping which can enable human-like sensations to robotic systems when grasping objects composed of multiple materials. These aspects may also be used as highly-tunable sensors enable robotic systems to handle more advanced and complicated tasks such as classifying touched materials.

In specific embodiments, such aspects are included in a sensor apparatus having a pressure sensor and a strain sensor used to concurrently provide measurements indicative of strain and pressure applied to the sensor apparatus. The pressure and strain sensors may concurrently provide measurements indicative of a pressure applied and deformation of at least a portion of the strain sensor responsive to a force applied to the sensor apparatus. Example measurements include impedance, capacitance, resistance, electric fields and/or electromagnetic fields, among other types of measurements.

Yet other detailed examples are aspects are directed to use of such pressure and strain sensors to act in a manner akin to how the human skin is capable of identifying softness of touched materials using pressure and strain sensing mechanoreceptors. While this multitude of sensation requirement has presented significant challenges in the development of compact devices capable of compliance sensing, by integrating a strain sensor and a pressure sensor, as disclosed through one of the examples herein, a compliance-based sensing apparatus is able to provide a sufficiently-thin form factor, which may be readily fabricated, to enable robotics in high spatial resolution. Such compliance-sensor technology may be used for a variety of applications including allowing for human-like softness sensation to robots and machines.

The above discussion is not intended to describe each aspect, feature or example embodiment of the present disclosure. The figures and/or more detailed discussion that follow are to provide an understanding of the present disclosure by way of non-limiting various example embodiments.

BRIEF DESCRIPTION OF FIGURES

Various example embodiments, including experimental examples, may be more completely understood in consideration of the following detailed description in connection with the accompanying drawings, with each of the following characterized figures being in accordance with certain exemplary aspects of the present disclosure. These aspects are more particularly characterized as follows.

FIGS. 1A-1G show various aspects included in depicted structures which may be used to detect material features such as softness and/or rigidity, wherein: FIG. 1A shows a sensing robotic hand; FIG. 1B is sensor array; FIG. 1C is another sensor array; FIG. 1D is a perspective cut-away view of a sensor structure; FIG. 1E is another perspective cut-away view of a sensor structure; FIG. 1F is graph showing simulation results from testing of an experimental example of a sensing structure; and FIG. 1G is an output plot of a certain example sensing method.

FIGS. 2A, 2B, 2C and 2D respectively show an integrated resistive-based sensor; a graph showing simulation results of the integrated resistive-based sensor; an integrated capacitive-based sensor; and a graph showing simulation results of the integrated capacitive-based sensor.

Figure 1A:
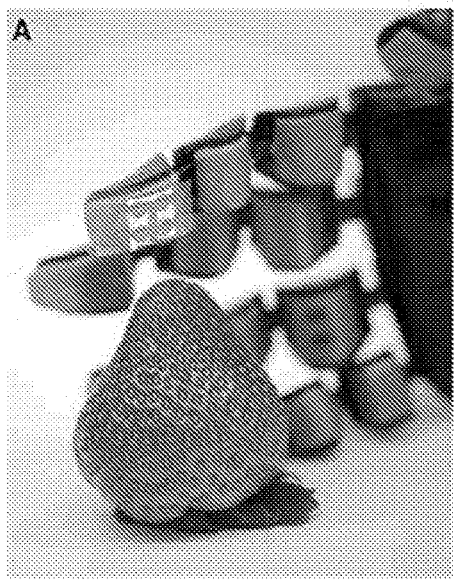

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of systems, devices, materials and methods directed to a strain sensor integrated with a membrane substrate, a pressure sensor, and a plurality of material layers, where such aspects are used to sense and respond to an object applying a force, by the pressure and strain sensors operating cooperatively to characterize or output information of the force applied and of deformation of the membrane substrate. One example of such an apparatus involves use of such a sensor apparatus to identify compliance of a material (e.g., by sensing features indicating the identity of the material) that would contact the sensor apparatus. Another example of arrayed sensor configuration allowing a softness mapping which is sufficiently accurate it can enable human-like sensations. While the present disclosure is believed to be applicable to a variety of different types of apparatuses, systems and methods involving a sensor apparatus, the disclosure is not necessarily limited to such specific aspects. An understanding of specific examples from the following description may be appreciated for an understanding thereof.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same connotation and/or reference numerals may be used in different diagrams to refer to the same elements or additional instances of the same element. Also, although aspects and/or features may in some cases be described in individual figures, it will be appreciated that aspects and/or features from one figure or embodiment can be combined with aspects and/or features of another figure or embodiment of the present disclosure even though the combination is not explicitly shown or explicitly described as a combination, and such combinations includes aspects and/features being used together regardless of which parts including but not limited to one or more aspects and examples of the underlying U.S. Provisional Application Ser. No. 62/925,703 filed on Oct. 24, 2019, to which priority is claimed.

Exemplary aspects of the present disclosure are related to a method involving a plurality of material layers that integrate a strain sensor, a membrane substrate and a pressure sensor, and using the strain sensor and the pressure sensor to respond to a force applied to or towards the pressure sensor. Further the method uses the pressure and strain sensors operating cooperatively, to generate information about the applied force and of deformation of the membrane substrate. According to other such exemplary aspects, an exemplary device includes a strain sensor integrated with a membrane substrate, a pressure sensor, and a plurality of material layers to integrate the strain sensor, the pressure sensor and the membrane substrate. The pressure and strain sensors, one or both of which may be resistive-based and/or capacitive-based, are configured to operate cooperatively to indicate, in response to a force applied to or towards the pressure sensor, characterization information of the force applied and of deformation of the membrane substrate.

One example use of such characterization information may be for indicating features of the object which is touched by or which touches (both referring to "touched object") as such indications infer a type of material associated with the object as in compliance sensing. In FIG. 1A and according to the present disclosure, such a sensor apparatus may be used as a compliance sensor at the end of a robotic or prosthetic digit for sensing, in this example instance, a strawberry. It is appreciated that such a compliance sensor is able to operate without a bulky external component such as a high-precision moving stage or high actuation voltage.

Consistent with the present disclosure and the above aspects, in more specific examples involving the above aspects, an array of membrane structures is configured and used as a strain sensor for strain measurement. The array is integrated with one or more pressure sensors configured as or including a microstructured-pressure sensing layer. The array of membrane structures may be customized and/or characterized as appropriate for a given application.

In some exemplary instances, array of membrane structures are characterized at least in part by a certain pitch distance, so as to provide regularity throughout the array. With the membrane substrate corresponding to at least one of the membrane structures in the array, the array faces a surface of the microstructured pressure sensing layer for sensing and gathering material-indicative compliance information from different locations of an object which would be applying the force.

In certain more specific embodiments, the above pressure sensor and strain sensor may be stacked on one another. In such embodiments, the post regions of the strain sensors include at least portions of the pressure sensor.

In yet other example devices and methods consistent with the above aspects, the present disclosure is directed to at least one section of the plurality of material layers of the pressure sensor (e.g., at least a portion of, if not the entire, membrane substrate) and a portion of the strain sensor including a composite material having different flexibilities and conductivities at different portions of the composite material. The composite material has an aperture formed therein and that extends from a first side of the composite material proximal towards a second side of the composite material that is opposite the first side, and has certain composite-material portions of the composite material that include aperture-proximal regions which have different degrees of flexibility than other composite-material portions of the composite material located nearer the second side of the composite material. Further the second side may be proximal to or may include at least a portion of the membrane substrate and in response to the applied force, at least a portion of the membrane substrate is to cause the aperture to reduce in at least one dimension toward closure of the aperture. The pressure sensor may also include at least a first electrode and the strain sensor may include a plurality of other electrodes, and with the strain sensor further including the membrane substrate having an aperture therein and with one of the plurality of other electrodes spanning the aperture. In such a configuration, the strain sensor is to change a dimension, in response to the applied force, toward closure of the aperture on one end by at least a portion of the membrane substrate, and the pressure sensor and the strain sensor operate concurrently (or simultaneously) for providing force-responsive measurements to indicate one of or a combination of the following: impedance, capacitance, resistance, electric fields and electromagnetic fields.

In such devices or system involving the above type of array, the membrane substrate may include another electrode; a dielectric material; and a composite material having different flexibilities and conductivity at different portions located at different locations of the array. The composite material may have a dimension-adjustable aperture formed on a first side of the composite material and extending toward a second side of the composite material that is opposite the first side, and the membrane substrate may cover the adjustable aperture in a mode of operation in which the force is not applied and to reduce the size dimension of adjustable aperture in another mode of operation in response to the force being applied.

In connection with other aspects involving one or more of the above sensing devices, certain of the pressure sensors and/or the strain sensors are tuned or configured to respond to the applied force. This tuning or configuring is in terms of one or more dimensions of: substrate thickness, material defining the aperture, one or more of the electrodes, and a gauge factor associated with lines used to form said one or more of the electrodes. Also the force may be applied to the pressure sensor for a plurality of energy applications associated in terms of time and/or locations relative to the pressure sensor.

In various aspects, the pressure sensor is formed by at least a first electrode, and optionally, the first electrode and a second electrode. In some examples, the first and second electrodes have a dielectric material between. The strain sensor is formed by a membrane substrate having an aperture therein with a third electrode spanning the aperture. The aperture may be closed on one end by at least a portion of membrane substrate, with the other end of the aperture being open. The pressure sensor and strain sensor may concurrently provide measurements indicative of a pressure applied and deformation of the membrane substrate responsive to a force applied to the sensor apparatus, such as impedance measurements. For example, the sensor circuitry may be coupled to the pressure sensor and the strain sensor, and provides an indication of compliance of a material that comes in contact with the sensor apparatus based on the concurrently provided measurements, the contact of the material causing the applied force.

The strain sensor may include an integrated resistive or capacitive strain sensor. Similarly, the pressure sensor may include an integrated resistive or capacitive pressure sensor. In some embodiments, the capacitive pressure sensor may include a first electrode and second electrode with a dielectric material between. The dielectric material of the pressure sensor may include microstructures in a pattern and/or the strain sensors include post regions having less flexibility than the membrane substrate, the post regions being formed at least partially by the pressure sensor. The strain sensor and/or pressure sensor may be a vertical or a lateral structure.

In yet other related embodiments, the pressure sensor and/or strain sensor are formed by stacked array or layers of substrates. As a specific example, the strain sensor may be stacked on top of the pressure sensor, with the strain sensor being proximal or including a touch surface of the sensor apparatus (although embodiments are not so limited, as the strain sensor and pressure sensor may be located adjacent to each other with one or more intervening materials and/or layers). In other related embodiments and/or in addition, one or more of the pressure sensor and the strain sensor are formed of a composite material in which different portions (e.g., depths and cross-section regions) of the composite material have different flexibilities and conductivities.

In specific embodiments, the membrane substrate and the first electrode, (and optionally one or more of a dielectric material and the second electrode) includes a composite material having different flexibilities and conductivity at different portions which forms the first electrode of the pressure sensor and the membrane substrate of the strain sensor. The composite material has the aperture formed on a first side of the composite material proximal to the first electrode and extending toward (but not to) a second side of the composite material that is opposite the first side. In such embodiments, portions of the composite material that includes the first electrode and post regions adjacent to the aperture have less flexibility than the second side of the composite material, the second side including at least a portion of the membrane substrate having a cross-section that spans across one end of the aperture with the third electrode and which is closed by the membrane substrate.

In other embodiments and/or in addition, the membrane substrate includes a first elastomer substrate having the third electrode and a second elastomer substrate having the aperture. The first elastomer substrate covers the one end of the aperture and is stacked on the second elastomer substrate. In more specific examples, the sensor apparatus includes a plurality of pressure sensors and a plurality of strain sensors arranged in an array.

A specific sensor apparatus includes a pressure sensor to exhibit changes in impedance in response to pressure applied thereto, a strain sensor, and sensor circuitry. The pressure sensor includes a first elastomer substrate having a first electrode, a second elastomer substrate having a second electrode, and, optionally, a dielectric material between the first and second substrates. The strain sensor includes post regions and a membrane substrate having an aperture and a third electrode that spans the aperture between the post regions, the aperture being closed on one end by at least a portion membrane substrate. The third electrode is to exhibit changes in impedance in response to deformation of the membrane substrate and the applied pressure. The sensor circuitry is coupled to the pressure sensor and the strain sensor to provide an indication of compliance of a material based on the changes in impedance exhibited by the pressure sensor and the strain sensor, the compliance of the material being based on the deformation of the membrane substrate and a magnitude of the applied force applied to the sensor apparatus.

Further examples are directed to a method for using and/or fabricating sensor apparatuses as characterized via one or more of the above embodiments. In one such example, a method is characterized by and/or includes tuning a modulus of respective ones of the different plurality of pressure sensors and the plurality of strain sensors by adjusting the type of material used in the substrates of the respective sensors, thickness of the substrates, radius of the apertures, width or length of the electrodes, and a gauge factor.

In other examples, the apparatus and/or methodology is directed to one of more of the following attributes or features including: (a) a plurality of pressure sensors formed by: 1) a first electrode that includes PET and Al; 2) an intermediate dielectric material used as a spacer between the first and second electrodes; and 3) a second electrode that includes PET and Al; (b) a plurality of strain sensors formed by 1) post regions that includes at least the first electrodes of the pressure sensors or portions of a composite material that forms the post regions and membrane substrate; 2) a membrane substrate having an aperture that is adjacent to the post regions; and 3) a third electrode that spans the aperture between the post regions; (c) the aperture being closed on one end by at least a portion membrane substrate, and optionally extending through one or more of the first electrode, second electrode, and intermediate dielectric material; and (d) identifying compliance of a material or object that comes in contact with the sensor apparatus based on impedance measured concurrently by at least one of the plurality of pressure sensors and at least one of the plurality of strain sensors.

For such sensing and (compliance-like) measurements, an example sensor apparatus, according to the present disclosure, may include a pressure sensor and a strain sensor used concurrently to provide the measurements indicative of strain and pressure being applied to the sensor apparatus and to measure pressure and strain in response to such applied forces thereto for identifying compliance (e.g., softness) of an object that comes in contact with and/or that causes the force. The measurements may include impedance, capacitance, resistance, electric fields and/or electromagnetic fields, such as fringe fields and resonant frequencies, among other types of measurements. In more specific examples, the pressure sensor may be formed by at least a first electrode, and optionally first and second electrodes. In some examples, the first and second electrodes have a dielectric material between, although embodiments are not so limited and the pressure sensor may include a resistive pressure sensor. The strain sensor may be formed by a membrane substrate having an aperture with a third electrode spanning the aperture. The aperture may be closed on one end by at least a portion membrane substrate. The pressure sensor and strain sensor may concurrently provide the measurements indicative of the pressure applied and deformation of a portion of the strain apparatus, such as a portion of the membrane substrate, responsive to a force applied to the sensor apparatus, e.g., contact by the material. Sensor circuitry may be coupled to the pressure sensor and the strain sensor, and provides an indication of the compliance of a material that comes in contact with the sensor apparatus, with the contact of the material causing the applied force.

In other more specific examples, the pressure sensor and strain sensor are intercoupled or integrated together and in some instances, the strain sensor may be more flexible than the pressure sensor, and/or with the pressure sensor may be sufficiently inflexible that deformation of the membrane substrate is prevented from or mitigated from causing the pressure sensor to flex. In such examples, the measurements concurrently obtained by the pressure sensor and strain sensor are decoupled in that both can be measured concurrently without (or with minimally) impacting the other (e.g., concurrent responses are decoupled and/or independent of one another). The strain sensor provides the measure (e.g., via an impedance measurement) in response to the deformation of the membrane substrate, and which is indicative of compliance of the material that comes in contact with the sensor apparatus to cause the deformation. The pressure sensor concurrently provides a measure (e.g., impedance measure) that is in response to the same contact of the material, and is indicative of a magnitude of pressure applied, and provides quantitative information for the compliance of the material.

The strain sensor may include an integrated resistive or capacitive strain sensor. Similarly, the pressure sensor may include an integrated resistive or capacitive pressure sensor. In some embodiments, the capacitive pressure sensor may include a first electrode and second electrode with a dielectric material between. The dielectric material of the pressure sensor may include microstructures in a pattern and/or the strain sensors include post regions having less flexibility than the membrane substrate, the post regions being formed at least partially by the pressure sensor. The strain sensor and/or pressure sensor may be a vertical or a lateral structure. In various embodiments, the sensor apparatus may include an array of a plurality of strain sensors and a plurality of pressure sensors. The different sensors may be tuned to have different sensitivities. For examples, respective ones of the different plurality of pressure sensors and the plurality of strain sensors may have a modulus tuned. In specific examples, the different sensors may be tuned to adjust the modules or otherwise impact the sensing range by adjusting: 1) the type of material forming the sensors, such as use of different polymers or other materials having different flexibilities and/or conductivities; 2) the thickness of the material/layers of the sensors; 3) the radius of the aperture (with the flexibility/deformation range increasing with the increase of the radius); and 4) the width of the metal lines forming the electrode of the strain electrode and the gauge factor. For example, a polydimethylsiloxane (PDMS) material has a wide modulus of elasticity in the range of 0.5 MPa-5 MPa, which may be tuned by adjusting the cross-linker ratio. Further, stiffness of the membrane structure could be tuned by geometrical parameters such as thickness and/or radius. Other example materials have different modulus of elasticity ranges, such as polysulfide rubber material has a modulus range of 0.1 MPa-0.2 MPa and urethane rubber material has as modulus range of 0.2 MPa-2 MPa. Adjusting the thickness to be thicker may cause increase in sensor range and to be thinner causes increase in sensitivity. An example radius of the aperture of 3 mm may have a sensitivity of 6 $\Omega$/pF, whereas a radius of 2 mm may have a sensitivity of 4 $\Omega$/pF. The aperture radius and material used to form the membrane substrate may be targeted for compliance ranges/softness, which a sensor apparatus include an array of sensors for different target ranges. The metal lines having a width of 250 μm may be more sensitive than metal lines of 500 μm.

In yet further examples, the pressure sensor and/or the stain sensor may be formed by a stacked layer of substrates. In some examples, the strain sensor and pressure sensor may be stacked on top of one another. For example, the strain sensor may be stacked on top of the pressure sensor, with the strain sensor being proximal to and/or including a touch surface of the sensor apparatus (e.g., a surface that is arranged to come in contact with other material and/or objects). The post regions of the strain sensor may, for example, include at least portions of the pressure sensor. In other examples, the strain sensor and pressure are adjacent to one another.

In yet various other specific examples according to the present disclosure, one or more of the pressure sensor and the strain sensor may be formed of a composite material in which different portions (e.g., depths and cross-section regions) of the composite material have different flexibilities and conductivities. For instance, the membrane substrate and the first electrode (and optionally one or more of a dielectric material and a second electrode) may include or be formed of a composite material having different flexibilities and conductivities at different portions, which portions are used to form the first electrode of the pressure sensor and the membrane substrate of the strain sensor. The composite material has the aperture formed on a first side of the composite material proximal to the first electrode and extending toward (but not to) a second side of the composite material that is opposite the first side. In such examples, portions of the composite material that include the first electrode and post regions adjacent to the aperture have less flexibility than the second side of the composite material, the second side including at least a portion of the membrane substrate having a cross-section that spans across one end of the aperture with the third electrode of the strain sensor and which is closed by the membrane substrate. Various different types of materials, for example, may be used as a composite material. For example, the composite material may include elastomer material, conductive material, and/or ionic conductive material, and various combinations thereof. The conductive material can be carbon powder, carbon nanotubes, graphene and/or other conducting particles or nanowire. The composite material may be a mixture of the above materials or the conductive material may be coated above the elastomer. Conductive material can also be a thin film of metal or metal pattern. Ionic conductive material may be a mixture of a polymer with a ionic salt with or without a plasticizer.

In further embodiments, a specific sensor apparatus includes a pressure sensor to exhibit changes in impedance in response to applied pressure applied thereto, a strain sensor, and sensor circuitry. The pressure sensor includes a first elastomer substrate having a first electrode, a second elastomer substrate having a second electrode, and a dielectric material between the first and second substrates. The strain sensor includes post regions and a membrane substrate having an aperture and a third electrode that spans the aperture between the post regions, the aperture being closed on one end by at least a portion membrane substrate. The third electrode is to exhibit changes in impedance in response to deformation of the electrode caused by the membrane substrate and in response to the applied pressure. The sensor circuitry is coupled to the pressure sensor and the strain sensor to provide an indication of compliance of a material based on the changes in impedance exhibited by the pressure sensor and the strain sensor, the compliance of the material being based on a deformation of the membrane substrate and a magnitude of the applied force applied to the sensor apparatus.

Experimental/More-detailed Embodiments

For information regarding detailed aspects, other examples and embodiments, the following discussion is directed to experimental examples and applications from which it would be appreciated that specific aspects and features from the following discussion may be combined in varying degrees with the foregoing portions of the present disclosure (including the teachings provided in the underlying U.S. Provisional Application as identified above). Although the experimental and/or more-detailed embodiments illustrate a capacitive pressure sensor which is stacked with a strain sensor, embodiments are not so limited. For example, the pressure sensor may be resistive and may be a lateral or vertical structure. As another example, the pressure sensor and strain sensor may be adjacent to one another, and not in a stacked formed.

Based on such experimental efforts, the present disclosure establishes that compliance-based sensors can be implemented as a part of artificial skin because a combination of compliance sensors with other sensors allow for differentiating materials and provide feedback during manipulation of objects. Deformation of the grasped objects may be related to their degree of softness. In these contexts, compliance sensors in accordance with various example embodiments may be used as a sensing tool or block for artificial skins to provide human-like sensations for prosthetic arms or robotic systems.

Accordingly, may be an important property associated with perception of softness in such sensors, and may be used to classify features of touched objects and to discriminate among different types of touched objects. Such sensors therefore act as mechanoreceptors as within our human skin for a human's touch sensation which can also capture different types of forces, such as pressure, texture, temperature variation and vibration. Among these receptors slowly adapting (SA) receptors, SA-I (Merkel cell) and SA-II (Ruffini organ) play a crucial role in softness sensation. The former measures static pressure applied on skin with high resolution while the latter is able to detect skin stretch. Certain sensing apparatuses according to the present disclosure incorporate not only the above-characterized integration of the pressure and strain sensors, but also sensors to classify and discriminate among touch-based parameters including one or more of the above parameters (pressure, texture, temperature variation and vibration).

Exemplary sensing apparatuses according to the present disclosure may also be directed to various types of compliance sensing mechanisms to transduce compliance of the touched material to an electrical signal that can be read digitally. For example, such a sensing apparatus may act as a cutometer for measurement of elasticity of skin by applying a negative air pressure to draw the skin into its probe and measuring deformation of the skin via an optical measurement system. In another example, such a sensing apparatus is a handheld device that utilizes tactile resonance sensor for detecting softness of skin.

Such sensing apparatuses may also be combined with piezoceramic structures for sensing and actuating terminals which can identify material properties, such as modulus of the touched material using structural contact dynamic relations between the material and sensor structure, and/or combined with an electronic whisker-like sensor that includes strain sensors and is used to identify softer materials when a known deformation is applied to substrate material. Other examples of sensing devices, according to the present disclosure, include flexible piezoelectric devices, MEMS-based sensors, and optic-based sensors.

Again in accordance with the present disclosure, specific exemplary compliance sensors that can be integrated into artificial skin fulfill the requirements of: (i) being a stand-alone unit that can be easily integrated to other sensors (e.g. pressure and temperature sensors); (ii) not necessarily requiring external components such as a pump and a moving stage, and (iii) each of the integrated sensors being decoupled, in terms of sensing, for reliable performance.

Yet other experimental example embodiments in accordance with the present disclosure are directed to a bio-inspired thin compliance sensor that simultaneously detects pressure and deformation similar to SA-I and SA-II in human skin without the need of any bulky external components. In order to mimic stretch and pressure sensation capability of SA-I and SA-II, a membrane-based strain sensor (MBSS) is coupled to a pressure sensor for identification of touched materials. As a result, the sensor apparatus can capture both the surface deflection of the touched material and the applied pressure, simultaneously. The two different sensing methods are developed for the MBSS by utilizing impedance-based sensors (e.g., resistive and capacitive-based sensors) and characterized with materials of different softness under varying pressure loads. For instance, the resistive sensor yields sensitivity of 11 Ω/N and 104 Ω/N when materials with modulus of 75 GPa and 20 kPa are tested, respectively. Similarly, the capacitive sensor results in a sensitivity of 80 fF/N and 1280 fF/N for similar materials, respectively. The tunable sensitivity of the sensor is demonstrated by reducing the membrane thickness. This can be useful in identifying softer materials with high resolution. The thin and small form-factor of the sensor enables it to be applied in different applications. In specific examples, the sensor apparatus is integrated into a robotic arm and identified softness of grasped objects. Other examples are directed to an apparatus which includes arrayed sensors, in which the sensor apparatus is used to map surface an object with non-uniform softness. This is useful to detect irregular objects inside soft tissues, such as tumors.

More detailed experiments according to the present disclosure use softness as a subjective measure of compliance which in turn is a function of material and geometrical properties and is closely related to the modulus of the material. Quantitatively, compliance is reciprocal of stiffness and for a bar structure under normal pressure the equation governing the deflection is given by:

$$F=kx \qquad \text{Eq (1)}$$

In Equation 1, k is stiffness of the structure, and x is the deformation. With k being dependent on geometrical and material parameters, and for a bar in compression it can be written as:

$$k=EA/L \qquad \text{Eq (2)}$$

where E is Young's modulus, A is area, and L is length of the bar along the pressure direction. Therefore, both geometrical and material properties play an important role in understanding of stiffness or compliance.

When a material is touched (or contacted) by a compliance sensor apparatus according to the present disclosure, compliance sensing can give an initial idea about the rigidity of a material with reference to the tactile information occurring due to sensation of the nature of contact as well as kinesthetic information resulting from the sense of forces or pressure. Furthermore, following Eqs. (1) and (2), modulus information can also be inferred if the thickness of the touched materials is similar to each other. From Eqn (1), two terms are measured in order to identify material features of the structure: (i) applied force (or pressure), and (ii) deformation in response to the applied force (e.g., strain). Therefore, these parameters are measured concurrently and/or simultaneously for compliance information. Further, with regards to sensor structure and output functionality, certain compliance sensor apparatuses according to the present disclosure are advantaged by having a thin form-factor, for being easily fabricated and deployed on small areas in an array configuration.

Figure 1B:
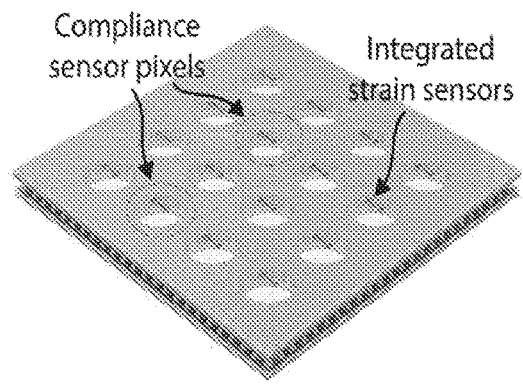

As discussed and illustrated in connection with the above examples and FIG. 1A, a sensor apparatus having a thin form-factor may be used for detecting softness of materials via a robotic hand with integrated compliance sensor array touching a variety of objects including, as examples, a strawberry, biological tissue, etc. FIG. 1B illustrates the compliance sensor array such as discussed above in various examples. FIG. 1C is an exploded view of a compliance sensor array showing laminated layers including stretchable strain sensor layer, post layer, top electrode, micro-structured dielectric layer, and bottom electrode layers.

A bottom subset in FIG. 1C shows a cross-sectional view of two sensor pixels and strain and pressure sensor layers. The strain sensor layer is used for detecting surface deformations on the touched material, whereas the pressure sensor layer detects applied pressure during touch.

Figure 1D:
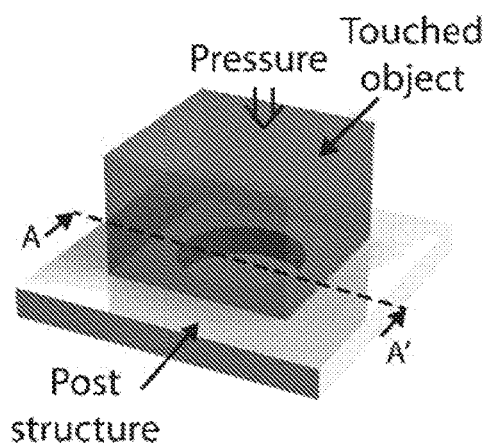
Figure 1C:
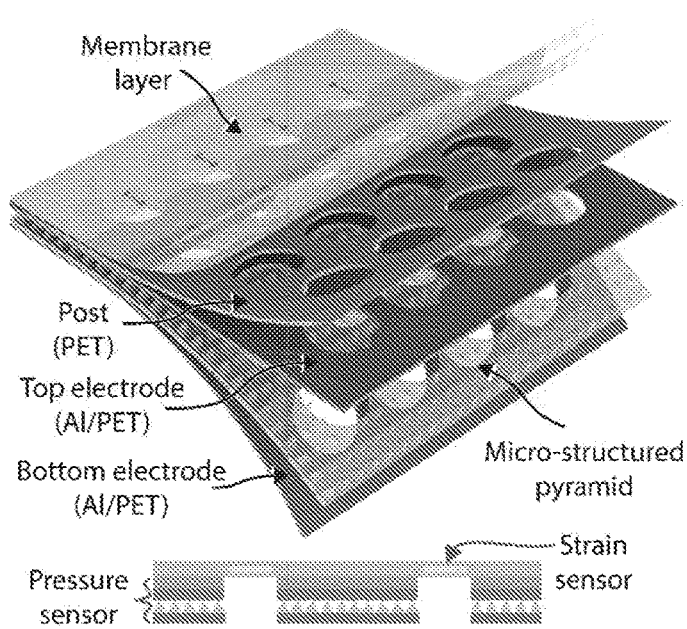
Figure 1E:
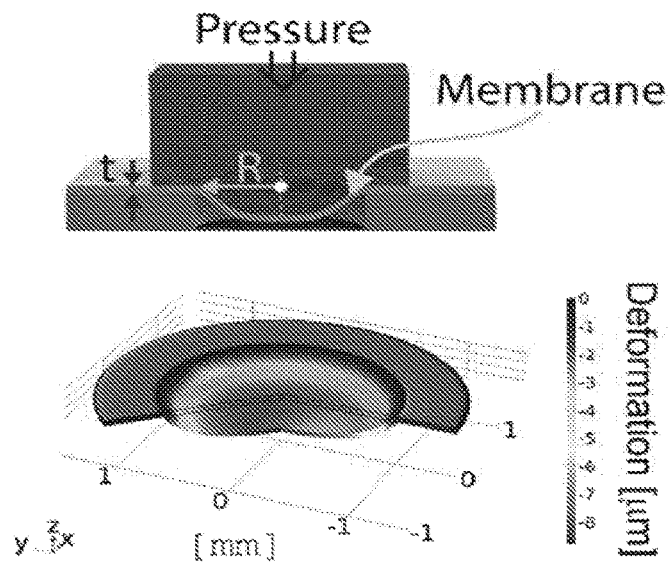
Figure 1F:
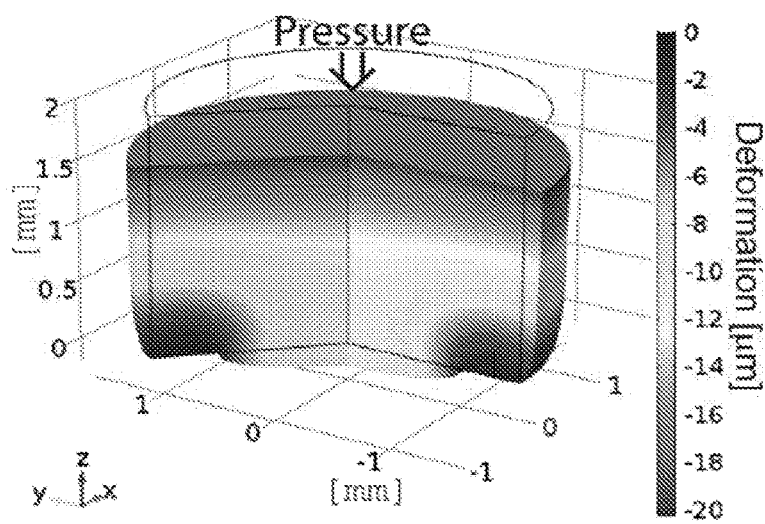
Figure 1G:
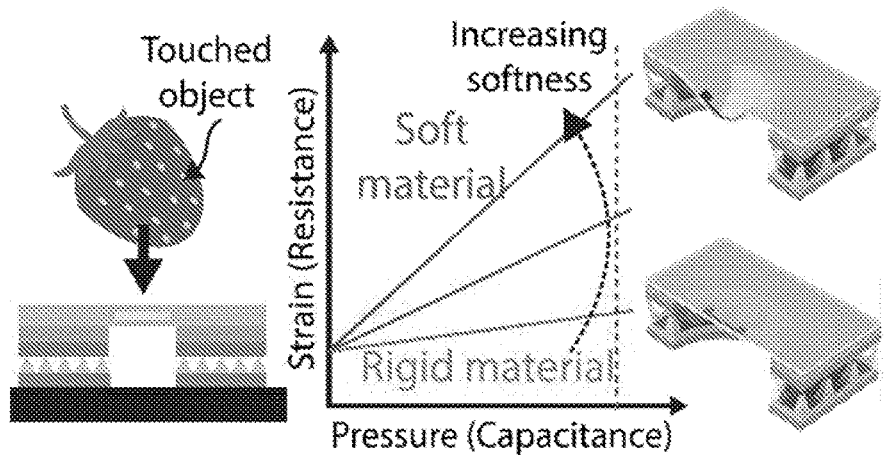

FIGS. 1D-1G are also illustrative of aspects of the sensor shown in FIGS. 1A-1C. FIG. 1D shows a schematic view of the deformation generating materials using a post structure with a circular opening that generates deformation on a specific region on the touched material when pressure is applied. FIG. 1E shows mechanical finite-element simulation results with an illustrated deformation contour plot in connection when a cylindrical object (e.g., having 2 mm thickness, 3 mm diameter and Young's Modulus of 100 kPa) is placed on a post structure with a 2 mm diameter circular opening under 1 kPa pressure. FIG. 1F shown mechanical simulation results with a deformation contour plot of a membrane with Young's modulus of 1 MPa placed on a post structure with 1 mm radius opening contacted with a material having Young's modulus of 100 kPa under 1 kPa applied pressure. The upper subset of this plot in FIG. 1F shows A-A' cross sectional view of touched material pressed against membrane placed on post structure (as shown in FIG. 1E). FIG. 1G shows an exemplary output plot of the proposed two-parameter sensing method. The strain sensor layer provides y-axis data as either resistive or capacitive change, while the pressure sensor layer provides x-axis force/pressure data as capacitance change.

To achieve results of such a compact compliance sensor in accordance with aspects of the present disclosure, a bi-layer sensing method may be used where the first layer consists of a stretchable membrane to detect surface deformation of the touched material and the second layer may consist of or include a micro-structured elastomer utilized as a pressure sensor. Although embodiments are not necessarily limited to the pressure sensor and strain sensor being layered as illustrated herein, such a sensor array can be fabricated by alignment and lamination of flexible layers as in FIGS. 1B and 1C. Each pixel (as encircled in FIG. 1B) includes, or optionally consists of, a post structure with one or more apertures (which may be circular or another shape) to allow the MBSS to deform together with the material when a pressure is applied. The MBSS may include a capacitive-based or resistive-based strain sensor aligned with respect to the (circular openings or) apertures on or adjacent to the post structure. When the MBSS effects contact to a material, it deforms as contact pressure increases as in FIG. 1D. This deformation per unit pressure depends on geometrical parameters such as membrane radius and thickness as well as material properties and becomes larger for soft materials compared to rigid materials. Therefore, the larger deformation translates as a higher sensitivity for softer materials. Meanwhile, the applied pressure is measured by the pressure sensor layer. Combining the outputs of the MBSS and the pressure sensor yields a higher strain response trend for softer materials as a function of pressure (e.g., a large slope for strain vs pressure) as in FIG. 1G. Depending on the requirements of the target applications, resolution and sensitivity of the sensor can be adjusted by modifying geometrical or material properties of the MBSS or the pressure sensor.

In such experiments and also according to the present disclosure, geometrical and material features of the sensor may be identified, along with responses to materials having different features, by using a finite element (FE) model. There are different structural designs that can force a material to deform around a pre-defined region. In various experimental embodiments, a design with a circular opening or aperture may be used because of uniform stress regions around the edges under pressure. The surface deformation of the touched material is dependent on its thickness, the applied pressure, and radius of the opening. FIGS. 1E and 1F show such FE results, where a 2 mm-thick material is applied against the block with a circular opening. See also FIG. 5A which shows the profile of the deformation around the circular opening for materials with different modulus.

In characterizing such an aperture and surrounding material, an FE model may be used to identify geometrical parameters of the MBSS. FIG. 1E shows the cross-sectional view of the device structure with the MBSS and deformation contour plots of the MBSS when a material is placed on top and a pressure is applied. SI FIG. 1B shows effect of radius on the deformation and suggests that it is especially important for detecting softer materials with high sensitivity. For instance, when the radius is increased from 0.5 mm to 2 mm, the deflection of the MBSS increased more than 4 times. See also FIG. 5C which shows that by varying modulus of the MBSS from 0.25 MPa to 2 MPa, there is not a considerable difference in the displacement. It can also be seen that identifying stiffer materials is more challenging because of the decrease in membrane deflection. That may involve optimization of geometrical parameters such as radius or thickness. This can be explained by considering the flexural rigidity of a membrane, D, defined as:

$$D = \frac{Et^3}{12(1-\vartheta^2)},\qquad\text{Eq (3)}$$

where t is thickness of the membrane and v is Poisson's ratio. Thus, for further sensitivity enhancement a thinner structure is used with a larger radius. By simply changing these geometrical parameters, the stiffness of the membrane is adjusted and different materials may be used, without the need to change the membrane material.

Figure 2D:
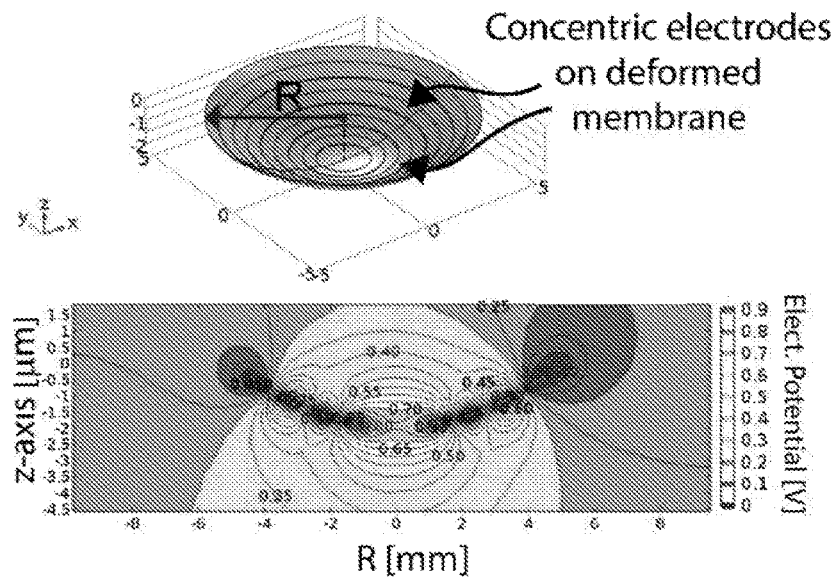

FIGS. 2A-2D illustrate that such above-noted examples may use (e.g., standalone) resistive and/or capacitive strain sensors for the MBSS, for example, with a double plate-like capacitor for such a pressure sensor. FIG. 2A show a resistive membrane-based (RMB) sensor and its cross-sectional view, while FIG. 2C shows corresponding views for a capacitive membrane-based (CMB) sensor. In FIG. 2A, the RMB sensor has a resistive strain sensor (bar-bell shaped with electrodes on either side) that is placed on the membrane and the membrane is placed above the pressure sensor layer. In this regard, the resistive strain sensor, the membrane and the pressure sensor layer may be considered stacked. The cross sectional image in FIG. 2A shows resistive and capacitive sensor components and legend shows example materials of each layer.

For each of FIGS. 2A and 2C, a common sub-image shows an example material types from right to left as Cr/Au (for the strain sensor), PDMS (pyramids-shaped material), Al (on either side of the PDMS), and PET (for the membrane on or in which the strain sensor is placed). In another example of a stacked arrangement of such materials (used in FIGS. 2A and 2C), the stack from top to bottom may be: the strain sensor on or in a PDMS layer for modulus sensing, which in turn is over or on a PET layer and which in turn is on a capacitive-force sensing structure which itself is a stacked sub-structure of PDMS between two electrode layers. In the stacked sub-structure of PDMS and as in other examples, the PDMS material may be solid and/or other than pyramid-shaped material.

FIG. 2B shows mechanical FE simulation results for the structural system of FIG. 2A, illustrating the strain on the membrane layer when materials with different modulus touch the sensor under 1 kPa. To understand responses of the strain sensors, strain on the membrane layer is simulated when pressured by the touched material to understand strain levels on the membrane as in FIG. 2B. For instance, when a 1 mm-radii and 50 μm-thick polydimethylsiloxane (PDMS) membrane is used to identify materials with modulus of 0.25 MPa (showing highest % strain) and 1 MPa (showing mid-level % strain), respectively, it results in almost two-fold increase in sensitivity, while a material with 10 MPa has almost no responses in radial strain.

In FIG. 2C, the CMB sensor is shown to have circular interdigitated electrodes (arranged in four concentric circles with electrodes on either side connecting respectively to the innermost and next innermost circle) for generating a fringe-field electric field on the membrane. For two such electrodes, the shape of the interdigitated electrodes provide any even number of circular shapes (rings) with each electrode connecting to an alternately-located ring. However, the shape of the interdigitated electrodes need not be ring shaped, more than two electrodes may be used to provide such capacitance, and one such electrode may be connected to an odd number of (alternately) rings. In these particular experimentally-based example structures, both RMB and CMB have pressure sensing layers that may be composed of micro-structured tapered pyramids with 50 μm base length and 20 μm height sandwiched in between Al coated PET films, but various sets of dimensions may be used (e.g., in some examples with such sets of dimensions increasing by up to a magnitude of order, or such sets of dimensions decreasing by up to a magnitude of order).

In FIG. 2D, electro-mechanical finite element simulation results show electric field lines on the membrane during deformation. The major parameter that determines the capacitance of this fringe-field capacitor is the gap between consecutive electrodes. To understand the behavior of the CMB, an electro-mechanical FE model may be developed for simulating the capacitance during loading as in FIG. 2D. There are two different regimes for the capacitive sensor, namely small and large deformation regimes. In small deformation regime, the increase in deformation increases curvature of the membrane which results in increase in capacitance. Then, further deforming the membrane, gaps between the electrodes increase due to stretching and dominates the effect of curvature. Therefore, the capacitance starts decreasing.

Such experimental examples may also involve certain fabrication and characterization of the sensors. For example, a compliance sensor apparatus that can measure two parameters simultaneously or concurrently may be fabricated by laminating several flexible layers. An example pressure sensor fabrication is described in Tee, B. C., et al., entitled "Tunable Flexible Pressure Sensors using Microstructured Elastomer Geometries for Intuitive Electronics", Advanced Functional Materials, 24(34), 5427-5434 (2014), which is incorporated herein by reference in its entirety. A micro-structured pyramid elastomer layer is prepared by using patterned silicon wafers as mold, stacked between top and bottom electrodes and placed below the 50 μm-thick membrane layer. A PDMS (10:1) may be used as the dielectric elastomer layer, which had micro-structured tapered pyramids with 50 μm base length and 20 μm height stacked in between 50 nm aluminum coated PET films with 25 μm thickness, although embodiments are not so limited. After stacking the pressure sensor layers, an additional PET layer is placed on top of the pressure sensor and the whole structure is laser cut with desired circular radius followed by lamination of the membrane layer.

The RMB sensor may be built by patterning a gold microcrack-based strain sensing layer. Microcracks can be induced Cr/Au layer by controlling deposition conditions and work as a resistive strain sensor as described by Lacour, S. P., et al., entitled "Stretchable gold conductors on elastomeric substrates", Applied Physics Letters, 82(15), 2404-2406 (2003), and Liu, Y., et al., entitled "Stretchable Motion Memory Devices Based on Mechanical Hybrid Materials", Advanced Materials, 29(34), 1701780" (2017), each of which are incorporated herein by reference in their entirety. These cracks change film resistance with applied strain and high sensitivity can be achieved. The sensor can be patterned by using a shadow mask on a PDMS layer. Critical geometrical features of the sensor such as length and width are defined by the shadow mask. The resistance of the RMB sensor is monitored through pads on the membrane, while the capacitance of the pressure sensor is monitored through top and bottom electrodes of the micro-structured elastomer layer, simultaneously.

According to certain experiments, an experimental setup as described below is utilized to apply cyclic loads through materials of different modulus. In specific examples, a particular elastomer is used (PDMS), with different cross-linker ratios that yielded materials with different moduli. In addition to glass which resembles a rigid material, three different PDMS ratios are tested, namely, PDMS (10:1), PDMS (25:1), PDMS (50:1). The materials have thickness of 3 mm and Young's modulus of 2.02±0.18 MPa, 0.39±0.038 MPa, 0.0247±0.0017 MPa, respectively, determined by uniaxial compression testing.

Figure 3A:
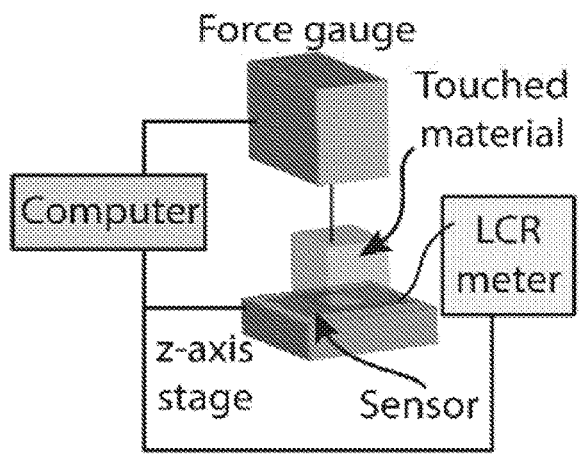
FIGS. 3A-3J show characterizations of exemplary integrated resistive-based and integrated capacitive-based sensors, wherein each of FIGS. 3A, 3B and 3H show structural aspects of such sensing apparatuses, and each of FIGS. 3C, 3D, 3E, 3F, 3G, 3I and 3J show respective graphs of testing with these sensing apparatuses involving parameters and/or applied forces.

In accordance with such testing as above and for characterization of RMB and CMB sensors, FIG. 3A shows a schematic view of an exemplary setup, with an automated high-precision vertical stage and force gauge that may be used to control applied pressure on the sensor. Materials with different moduli and similar thicknesses are placed on top of the sensor and contacted to the force gauge to measure applied force during loading. Four different materials result in different sensitivity on the MBSS while their pressure sensor reading gives similar outputs.

Figure 3B:
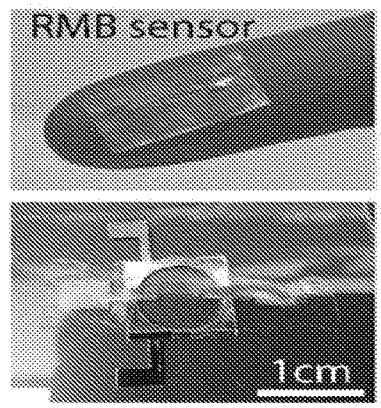

FIG. 3B shows a fabricated resistive membrane layer after evaporation and after lamination process. The characterized RMB sensor may have a width dimension of 500 μm, a length dimension of 4 mm, and with 6 mm diameter circular opening. Such dimensions may be patterned during evaporation (e.g., using a shadow mask within 32 μm-thick PDMS (10:1) for the membrane). In such experiments, the RMB sensors with a PDMS membrane may be characterized with the 4 mm length and the 0.5 mm-wide strain sensor (laminated directly or indirectly via another layer) on the pressure sensor so as to provide a footprint of 1×1 $cm^2$.

Figure 3C:
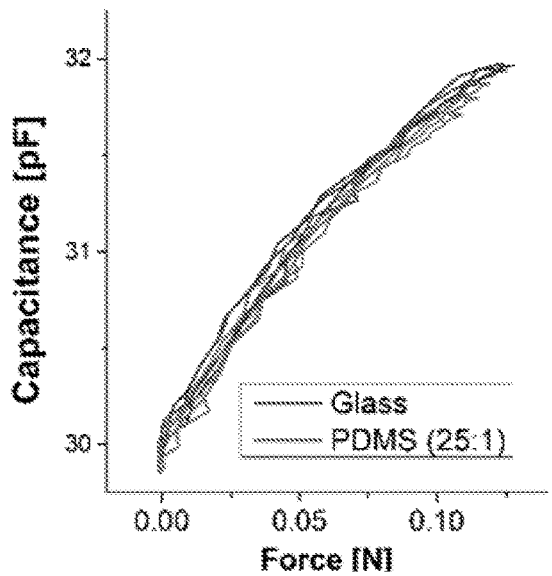
Figure 3D:
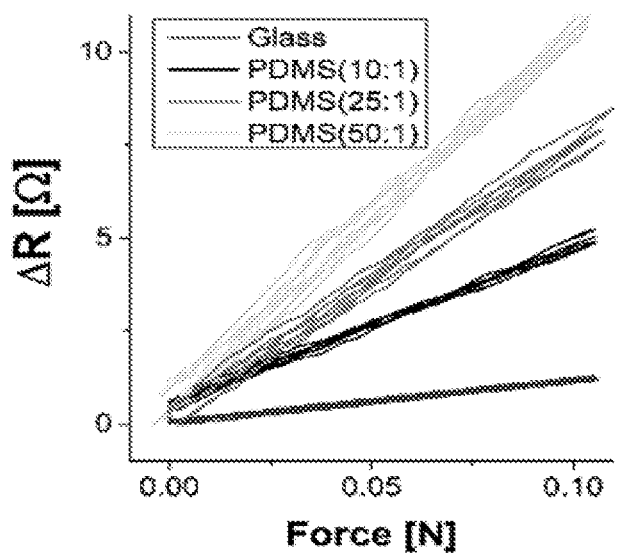
Figure 3E:
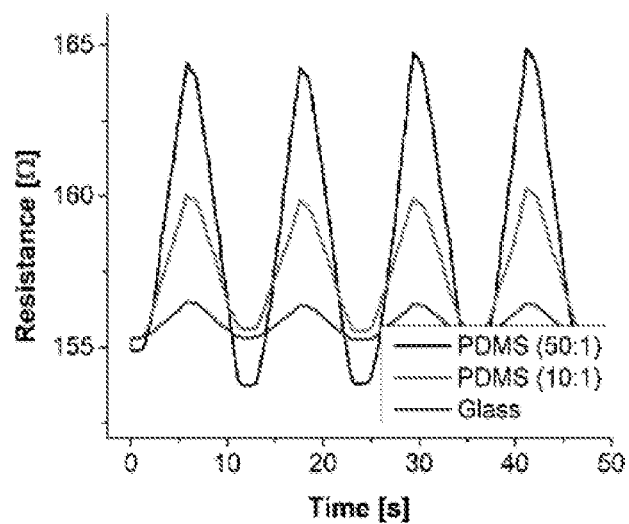
Figure 3F:
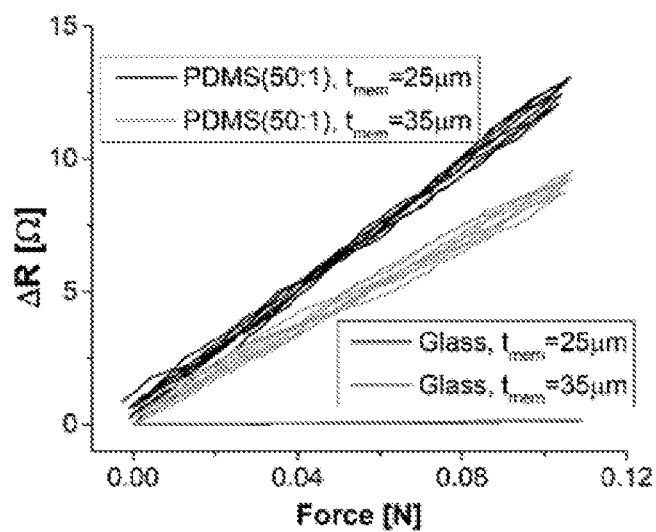
Figure 3G:
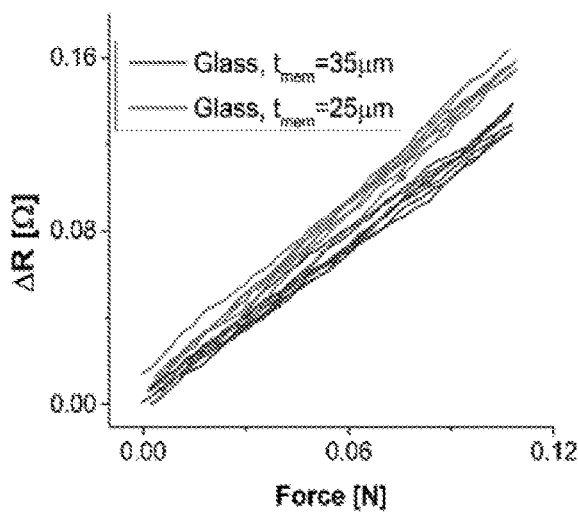
Figure 3H:
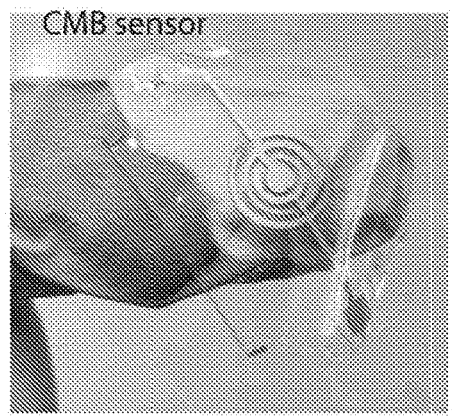
Figure 3I:
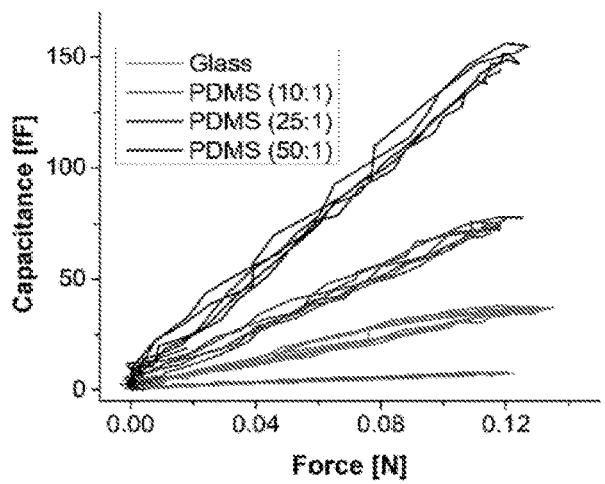

FIGS. 3C and 3D show obtained characterization results, with FIG. 3C plotting output of capacitive pressure sensor showing similar outputs for glass and PDMS (25:1) and FIG. 3D plotting output of resistive strain sensor to materials of different modulus (as with FIGS. 3E, 3F and 3I, glass is plotted closest to the horizontal axis, PDMS(50:1) shows largest variation along vertical axis, and PDMS(10:1) shows smallest variations). When the sensor is in contact with softer materials sensor responded with higher sensitivity (resistance change per applied pressure). For the softest material, PDMS (50:1), almost a 2× more change in resistance was observed compared to PDMS (10:1). Sensitivities of 104±7.8 Ω/N, 75±6.1 Ω/N, 47±2.4 Ω/N, 11±0.94 Ω/N were measured for PDMS (50:1), PDMS (25:1), PDMS (10:1), and glass, respectively. Accordingly, softer materials result in higher resistance change and vice versa.

FIG. 3E shows time responses of the experimental RMB sensor for three different materials under the same cyclic pressure profile. Even though different materials yielded different sensitivities, the pressure sensor beneath is shown to yield similar responses during loading cycles. This observation confirms the sensor to be used as a standalone compliance sensor. Long cyclic tests of the sensor with different materials for 500 cycles shows the repeatability of the sensor output (see also related FIGS. 6A, 6B and 6C which show supplemental data in this regard).

As described earlier, geometrical parameters of the sensor can be adjusted to tailor the sensor for accommodating a specific range of soft materials. For instance, by reducing the thickness of the membrane, sensitivity of the sensor can be enhanced which could be useful in identifying softer materials. The RMB sensor is tunable by adjusting the membrane thickness from 25 µm to 35 µm. Both sensors are characterized using the similar procedure described previously using PDMS (50:1) and glass materials. FIG. 3F shows the resistance change under loading cycle of sensors with different membrane thicknesses when touched with PDMS (50:1) and glass. The sensitivity is increased from 85 Ω/N to 120 Ω/N for PDMS (50:1) for sensors with membrane thickness of 35 µm and 25 µm, respectively.

FIG. 3G shows a close-up view of the sensors' response when glass is touched and again a higher sensitivity was observed with the sensor having thinner membrane. This demonstrates that by sensitivity of the RMB can be further tuned for compliance sensing using geometrical parameters up to a certain pressure which is limited to 10 kPa in this case. The maximum operational pressure can be tailored by changing geometrical features of the sensor. However, after the maximum operational pressure, due to gap spacing below the MBSS and non-linear material behavior during large-deformation regime, the compliance sensor cannot provide decoupled strain sensor and pressure sensor responses. Fortunately, simultaneous reading of these sensors up to the operational pressure is enough to generate the required sensitivity parameter for material compliance identification (see also related FIGS. 7 and 9 as discussed below).

An experimental capacitive membrane-based (CMB) sensor may be developed by integrating a single layer membrane-type capacitor with the pressure sensor (as shown above in connection with FIG. 2C). While such a capacitive sensor may be designed with double-plate capacitor structures, in this specific example, using stacked metal layers is problematic considering the non-uniform normal pressure on a deflecting membrane. To develop a planar capacitive strain sensor, fringe-field effects and circular interdigitated electrodes on the membrane are used. FIG. 3H shows the fabricated design may provide lower sensitivity compared to double-plate capacitors. However, it can be built by depositing a single metal layer and prevents stress related artifacts due to additional layers. The fabrication of the membrane with fringe-field capacitor starts with spin coating a PDMS (10:1) layer on a glass slide followed by metal evaporation through a shadow mask as described previously. Then, another PDMS (10:1) layer is spin-coated for encapsulation purposes while protecting the contact pads used for measurements. In parallel, the pressure sensor is prepared as described earlier. The metal patterned membrane is laminated on top of the pressure sensor while the interdigitated electrodes are aligned to the circular opening of the pressure sensor. The characterized sensor had a 35 µm-thick PDMS (10:1) membrane with an electrode gap and width of 450 µm and 500 µm, respectively.

As shown in FIG. 3I, sensitivities of 1280±79 fF/N, 680±52 fF/N, 270±18 fF/N, and 80±6.2 fF/N are measured for PDMS (50:1), PDMS (25:1), PDMS (10:1), and glass, respectively.

Figure 3J:
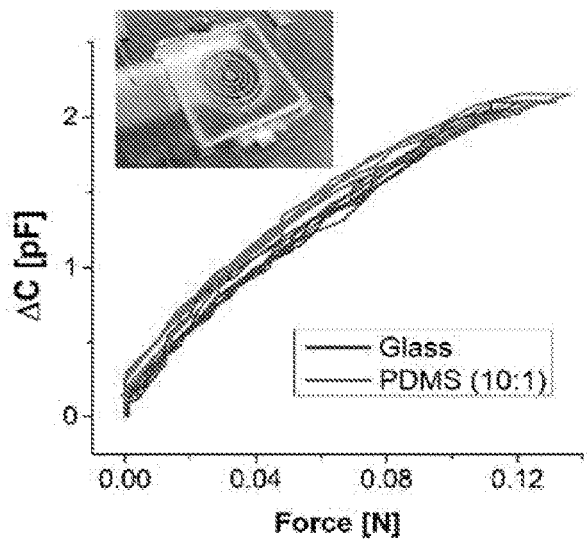

Pressure sensor responses for different tested materials are shown in FIG. 3J, with plots for glass being shown slightly closer to the X axis than for PDMS(10:1). Even though the capacitive sensor seems to provide a better sensitivity for identification of softer materials, the effect of further membrane deformation results in the decrease in its sensitivity, thus allowing for a low applied force. This limits further usage in identification of softer materials when higher force or larger radius are needed to increase the capacitance changes to provide a better resolution. In addition, another approach to increase sensitivity is to design electrodes with smaller gaps and widths which might require an extensive lithography process on a soft substrate.

To provide an example of a robotic finger with softness sensation and as with development of artificial-skin concept according to the present disclosure, different sensors may be used. This approach may also be used in other applications including robotic and prosthetic applications. For example, the bio-inspired compliance sensor apparatus, as described herein, can be used for a sensing capability of a robot. For example, the sensor can be placed on a robotic finger which then can identify softness of touched materials. Furthermore, since there is already a built-in pressure sensor, a multitude of sensations can be provided. To assess the feasibility of its application, a standalone sensing unit is fabricated that includes an RMB sensor.

Figure 4A:
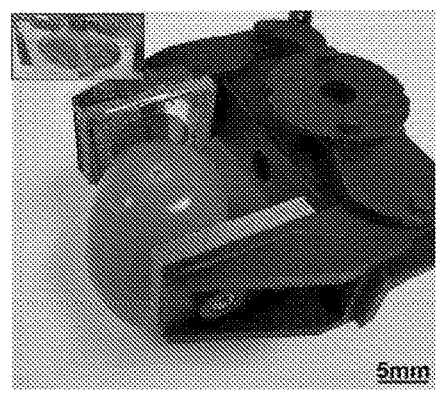
FIGS. 4A-4H show characterizations of exemplary sensors for exemplifying one way of softness-sensing mapping, wherein each of FIGS. 4A, 4B, 4C, 4D, 4G and 4H show structural aspects of such sensing apparatuses, and each of FIGS. 4E and 4F show respective graphs of testing with these sensing apparatuses involving sensing parameters over time.
Figure 4B:
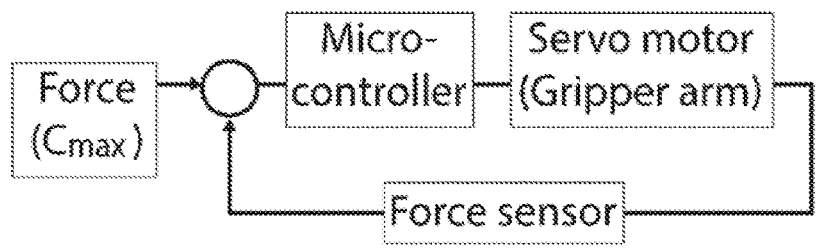
Figure 4C:
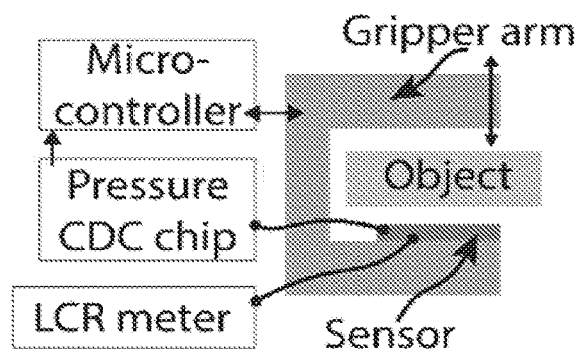
Figure 4D:
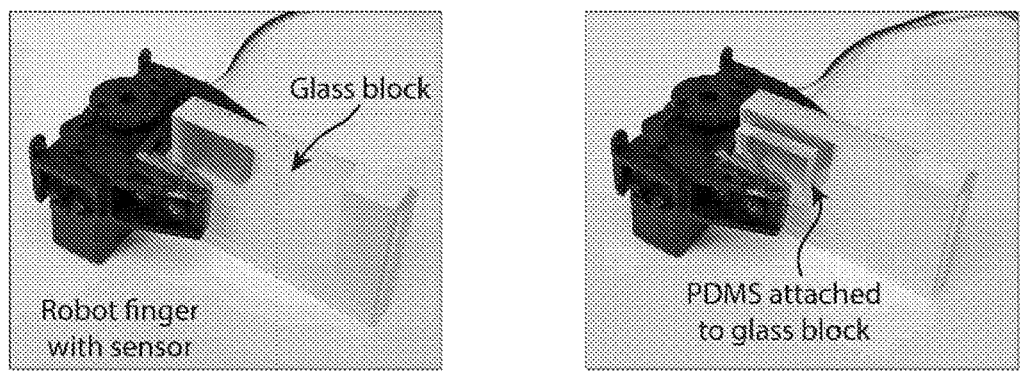

FIGS. 4A-4H are directed to integration of softness sensor to a robotic gripper and demonstration of softness mapping, with the optical image of FIG. 4A showing a robotic finger holding a fresh tomato with integrated softness sensor. FIG. 4A also shows such a sensor with a footprint of 1×1 cm$^2$ being integrated on one side (or both sides) of a robotic arm (the subset image shows close-up view of the mounted sensor). For example, this may be for use in a system in which the robotic arm may be connected (or communicatively coupled) to a micro-controller and a custom software for control. Further, a feedback loop may be programmed using the pressure sensor readings of the sensor as shown in the block diagram in FIG. 4B. The pressure response is recorded using a commercial capacitance-to-digital (CDC) converter chip connected to the microcontroller. At the same time, resistance of the RMB sensor is recorded using an LCR-meter. FIG. 4C shows the test setup schematic. Different materials are placed in between the robot arm to test the ability of the robot to identify touched materials. Once the capacitance reaches the maximum limit, the robot finger stops for a second and starts moving in opposite direction to release the grasped material. FIG. 4D shows the setup with a glass block to identify rigid and soft materials. In order to test materials other than glass, PDMS blocks are attached to glass block to allow contact to the sensor.

Figure 4E:
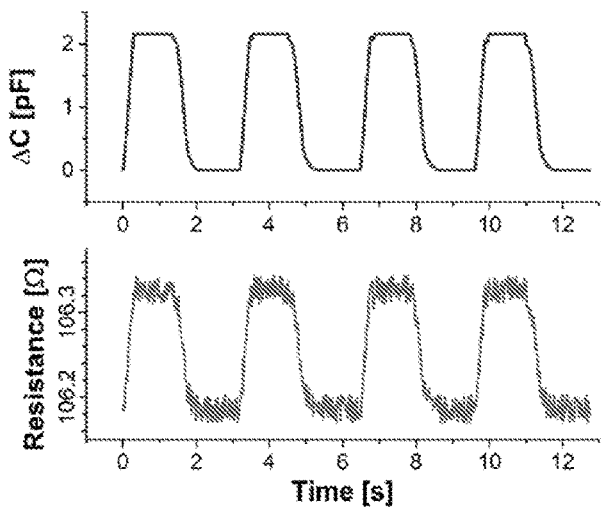
Figure 4G:
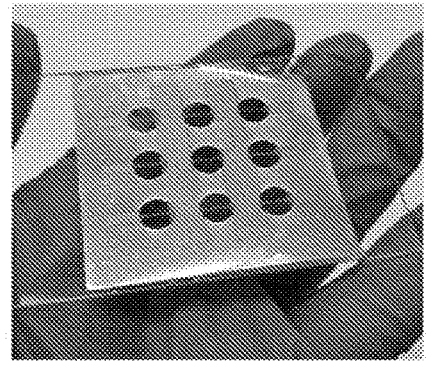

FIG. 4E shows simultaneous capacitance and resistance recordings from the compliance sensor, via a time response of the standalone sensing unit. The top plot shows capacitance output of the pressure sensor layer whereas the bottom plot shows resistance output of the strain sensor layer while touching a glass object.

Figure 4F:
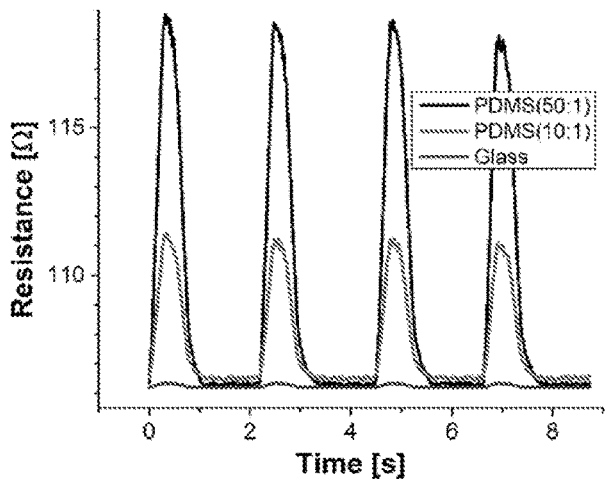

FIG. 4F shows resistance output of such an RMB sensor while grasping objects with different modulus, such as resistance readings of the sensor for three different materials grasped by the robot arm (glass being plotted almost horizontally and PDMS(50:1) showing a larger resistance variation than for PDMS(10:1)). For softer materials maximum resistance value increases under similarly applied force. With this result, the ability of the sensor to be used as a compliance sensor on robotic arms to enable softness sensation is demonstrated.

Such examples in accordance with the present disclosure may also use softness mapping as in our daily lives, wherein 'hybrid' items made up of multiple materials with different degrees of softness are often touched. Developing a sensation to discern different softness with sensors requires these sensors to possess high spatial resolution (as in FIG. 1A). In addition to a robotic arm, a multi-material sensing platform is needed, especially for prosthetic applications to mimic or enable real life experiences.

Figure 4H:
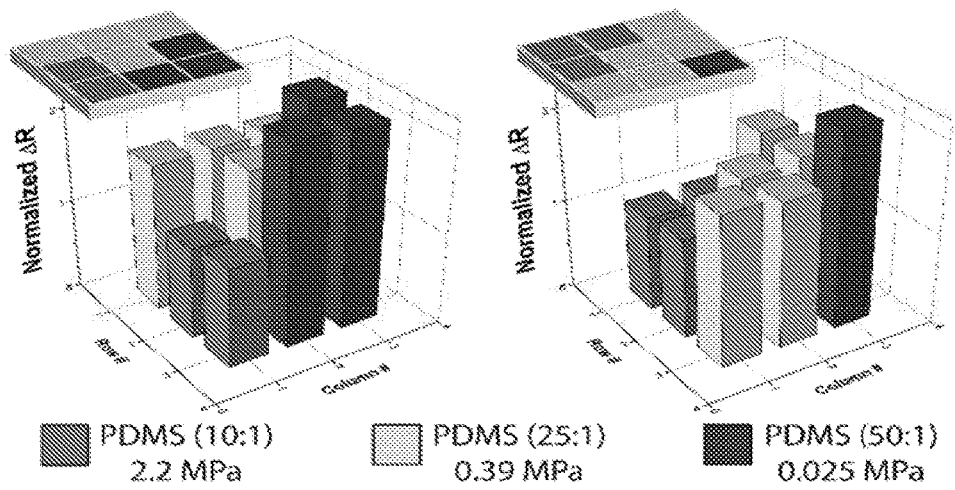

To realize such an example platform, multiple sensors may be integrated in a smaller footprint, similar to mapping devices which has an array of sensors confined to a small area. Two different example softness mapping devices are developed to show the applicability of the sensor for prosthetic applications. The first device has a 3×3 array as in FIG. 4G. Each sensor pixel has a circular opening of 5 mm with 3.2 mm long strain sensors (across each such opening as in FIGS. 2A and/or 2C). Two different scenarios are tested by placing three different example materials on a glass slide in different ratios. First, 4 out of 9 sections of the glass slide are covered with PDMS (25:1), while the remaining areas are covered with the softer PDMS (50:1) and harder PDMS (10:1) (FIG. 4H inset). For the second test, 5 out of 9 sections the area are covered with PDMS (25:1), 3 out of 9 sections are covered with PDMS (10:1) and only 1 out of 9 section is covered with PDMS (50:1). The glass slide holder is then placed on to the sensing platform with materials touching the sensors and a uniform pressure was applied through the glass backing substrate. Resistance and capacitance outputs of the sensors were recorded simultaneously.

FIG. 4H shows the responses of the sensor pixels due to applied force of 0.12 N through the multi-material holder. This testing may use three different materials engaged to be in contact with the sensor at a pressure of 10 kPa. The subset image shows illustration of the sensor and applied combination of materials (Scenario 1: normalized resistance changes in ascending order 1.00, 1.04, 1.56, 1.57, 1.62, 1.62, 2.18, 2.22, 2.23; Scenario 2: normalized resistance changes in ascending order 1.00, 1.02, 1.02, 1.52, 1.55, 1.62, 1.62, 1.63, 2.25). Results show normalized average resistance change of 10 loading cycles. Each RMB sensor pixel has a circular opening of 5 mm with aligned strain sensor of 3.2 mm long and 450 μm width at the center of the opening.

For both tests (scenarios 1 and 2) of FIG. 4H, pixels touching the softer material have relatively higher resistance change and sensitivity, as expected. For the first case, average normalized resistance changes of 1.00, 1.04, 1.56, 1.57, 1.62, 1.62, 2.18, 2.22, and 2.23 were observed for each pixel. For the second case, a similar trend was observed for same materials with average normalized changes of 1.00, 1.02, 1.02, 1.52, 1.55, 1.62, 1.62, 1.63, 2.25. For both cases, the compliance sensor apparatus is able to identify soft and hard materials demonstrating the capability of the device as a potential prosthetic sensor. In some cases, slight variations in the pixels' responses are observed even if the same material are in contact. This may be due to variations in the center alignment of strain sensors with respect to circular openings of post structure. The pixel variations can be further improved with better equipment that can control alignment of the layers during lamination process. Such high-resolution softness sensors can be useful in future prosthetic and robotic applications, where human skin-like features are desired. To show the scalability of the proposed method, a small form-factor 2×2 compliance sensor array with a footprint of 1.2×1.2 cm2 may be fabricated (see also related FIG. 9B as discussed below).

Accordingly, such sensing approaches and systems may be used to enable next-generation human-machine interactions, and such mapping tools may be used to monitor 'harder' materials embedded in soft materials for medical applications, such as detection of tumors for breast cancer.

Many materials and methods may be used in such experiments. For silicon etching: A bare Si <100> wafer with 300 nm thermally grown oxide were patterned using photolithography and wet etching (e.g., 6:1 BOE). Then, oxide was used as a mask during anisotropic silicon etching process. A potassium hydroxide solution (e.g., 30%, 80° C.) was used for silicon etching followed by oxide stripping using (e.g., 6:1 BOE). The etched wafer was used as a mold during micro-structured pyramid layer preparation.

For characterization of the sensors, an automated high-precision vertical stage may be used to control applied pressure on the sensor. A custom software may be used to control the vertical stage and record capacitance and/or resistance of the sensors as well as force gauge readings (as in FIG. 3A). Materials with different modulus and controlled thickness were placed on top of the sensor and contacted to the force gauge to measure applied force during loading. As the moving stage elevates, the pressure applied on the material increases and the force gauge records the applied force which is recorded by computer to control the moving stage.

Pressure sensor fabrication may be achieved, for example, by fabricating the pressure sensor layer using a 10:1 mixture of PDMS elastomer (e.g., Sylgard 184, Dow Corning) to cross-linker being mixed for 3 minutes at 2000 rpm. Then, a thin layer of resist (e.g., S1813, MicroChem) may be spun coated as a sacrificial layer on a mold wafer at 5500 rpm for 1 minute followed by soft bake at 90° C. for 2 minutes. Then, the PDMS mixture may be poured on the mold wafer and spin coated at 1500 rpm followed by curing process at 150° C. for 20 minutes. The sacrificial layer may be removed using acetone and the PDMS elastomer layer transferred to a PET film for handling purposes. The elastomer layer may be then laminated in between aluminum (e.g., 50 nm) coated PET films (e.g., 25 μm) such that metal coated sides are touching the elastomer to increase sensitivity of the pressure sensor. Finally, the laminated layers may be laser cut (e.g., Epilog, M2 Fusion) using CO2 laser (a power of 15 W and frequency of 15 Hz) and circular openings for membranes may be patterned.

With regards to fabricating an experimental membrane-based resistive sensor, one example approach is as follows. First, Dextran (e.g., Sigma Aldrich, Mw 100,000) sacrificial layer may be spin coated on glass slide (e.g., 2"×3") followed by spin coating PDMS with desired mixture ratios (e.g., 10:1, 25:1, or 50:1) and cured at room temperature for overnight. A shadow mask may then be prepared by CO2 laser cutting a Kapton tape with desired resistive sensor pattern. Then, Cr/Au/Cr (e.g., Cr, 4 nm with 0.1 A/s, Au, 50 nm with 2 A/s) metal may be evaporated on the elastomer through the shadow mask. The sacrificial layer may be dissolved in water and membrane layer is then easily transferred to a PET temporary holder. Finally, the membrane layer may be aligned to the pressure sensor such that strain sensitive region is placed at the middle of the circular opening of the pressure sensor.

As one approach to fabricate an example of a membrane-based capacitive sensor, an approach may be used that is similar to fabrication of the above resistive sensor, except for the capacitive sensor fabrication a second layer of PDMS may be spin coated on top of the electrode layer to provide encapsulation. After peel off process, the structure may be aligned and laminated on top of the pressure sensor.

To demonstrate use of sensor apparatus as a robotic gripper, the fabricated sensor may be mounted on one side of a robotic gripper robot's fingers (e.g., Lynxmotion Little Grip Kit, Robotshop). The sensor may be connected to an LCR-meter (e.g., Agilent E4980A) for resistance measurements and monitored through a custom-built software through a computer. A capacitance-to-digital converter microchip (FDC1004, Texas Instruments) was connected to the pressure sensor for capacitance measurement. The chip may be connected to the micro-controller and monitored through a computer. The robot finger may also be connected to the controller (Arduino Uno, Rev 3) and a feedback loop may be developed using a program (software) developed for the microcontroller. PDMS mixtures with different ratios are then prepared and molded (e.g., to have 4 mm of final thickness). Finally, materials may be placed in between the gripper fingers for grasping tests.

Figure 5A:
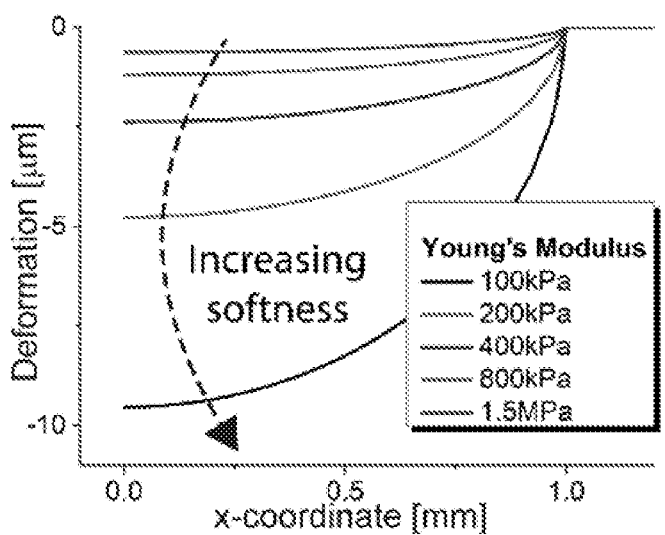
FIGS. 5A, 5B and 5C are further respective graphs showing finite element simulation results from experimental testing of one or more example sensing structures.
Figure 5B:
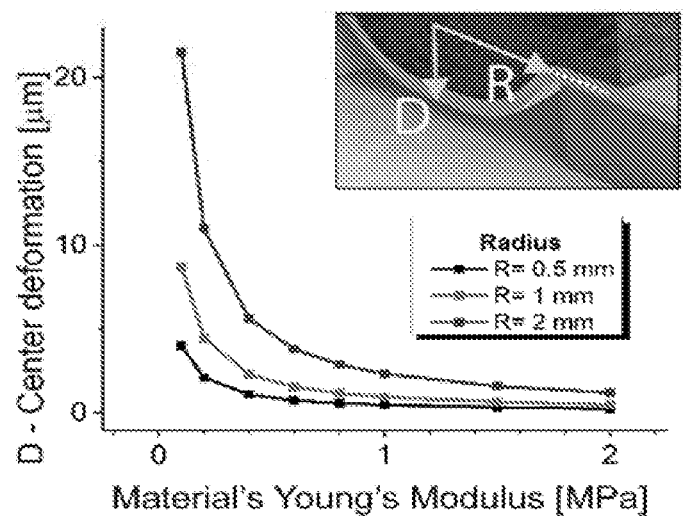
Figure 5C:
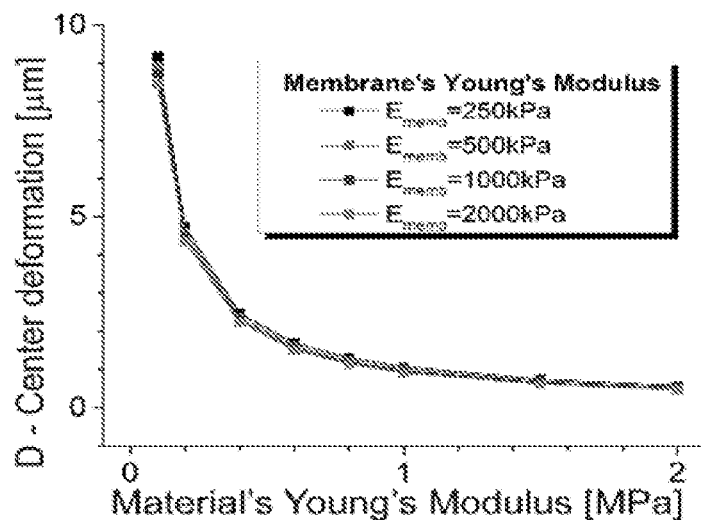

FIGS. 5A, 5B and 5C provides supplementary experimental data including FE simulation results (e.g., associated with such structures as shown in FIGS. 1A and 1C). FIG. 5A shows a deflection profile of touched materials of different Young's modulus under 1 kPa of pressure (the material with a Young's modulus of 100 kPa along the bottom plot associated with the most softness). The X-coordinate refers to the radial axis shown in FIG. 5B, which in turn shows the related simulation results. FIG. 5B also shows the effect of the radius of the circular opening on center deflection of the membrane structure with the subset figure depicting center deflection ("D") of the membrane, and radius ("R"). FIG. 5C shows the membrane's Young's modulus relative to the center deflection ("D") of the membrane.

Figure 6A:
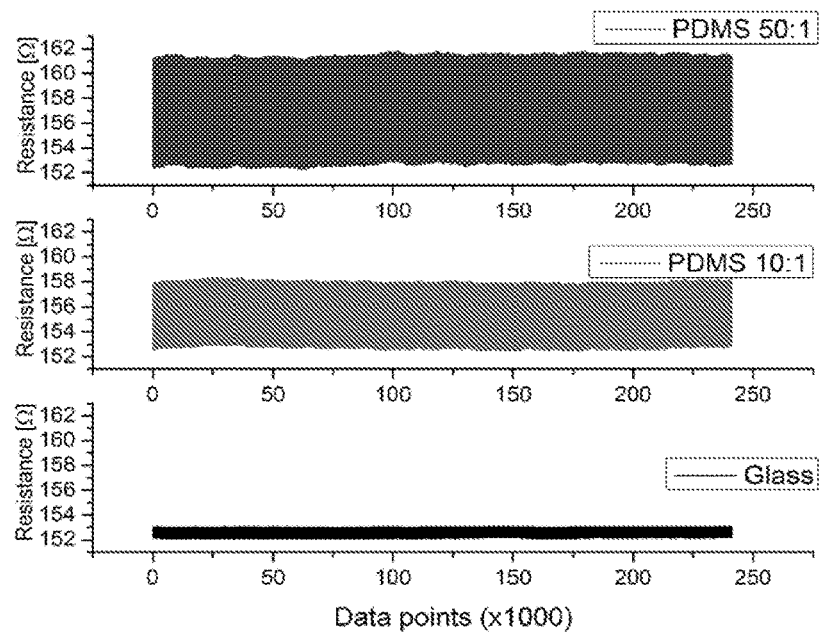
FIGS. 6A, 6B and 6C are further respective graphs showing cyclic results from experimental testing of one or more example resistive-membrane-based (RMB) sensing structures.
Figure 6B:
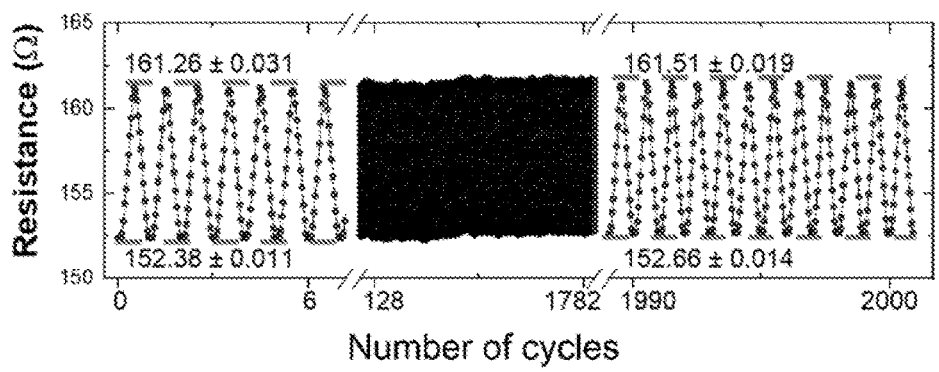
Figure 6C:
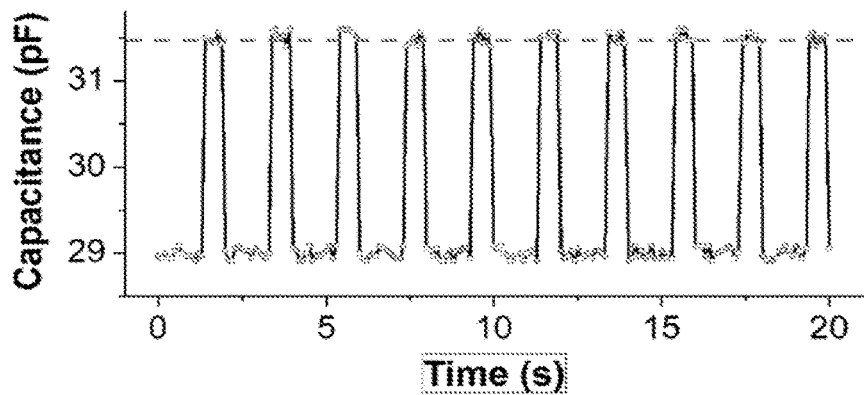

FIGS. 6A, 6B and 6C provide supplementary experimental data including cyclic test results associated with such RMB sensor structures as discussed and shown above. In FIG. 6A and shown respectively from top to bottom plots, the test results are for PDMS (50:1), PDMS (10:1), and glass under 500 cycles with the same applied pressure. In FIG. 6B, the test results are for 2000 cycle of PDMS(50:1) response showing significant undulation and with first and last few cycles in detail (and with the response of glass in the middle spanning 128-1782 cycles). In FIG. 6C, the test results are for dynamic loading of the pressure sensor for precision and accuracy, with the upper dashed line corresponding to the PDMS (10:1), and the undulating plot corresponding to the glass. Measurement error may be calculated (e.g., by $C_{meas}-C_{ref})/C_{ref} \times 100\%$). The value $C_{ref}$ is found by averaging the capacitance output when applying the dummy mass corresponding to 10 kPa pressure load for 1 min period. Measurement error of 0.56% may be obtained for the pressure sensor for the pressure load of 10 kPa.

Figure 7A:
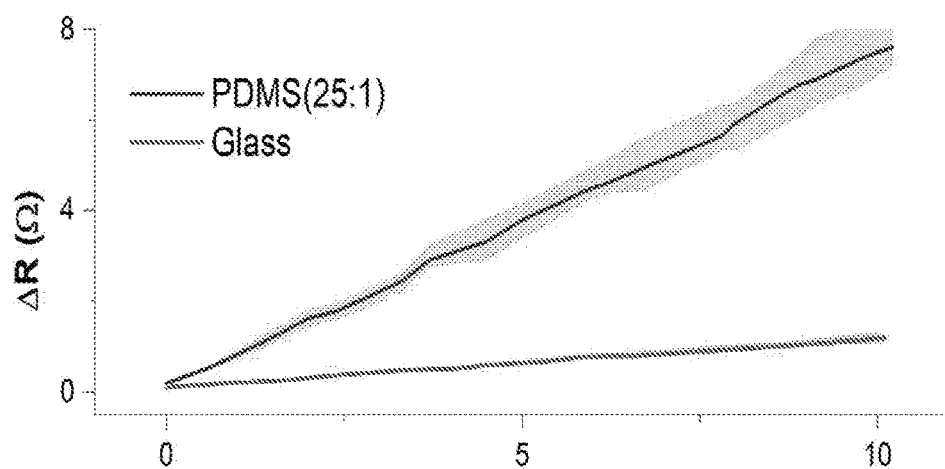
FIGS. 7A and 7B are further respective graphs showing results from experimental testing associated with multi-modal sensing operation of one or more example sensing structures.
Figure 7B:
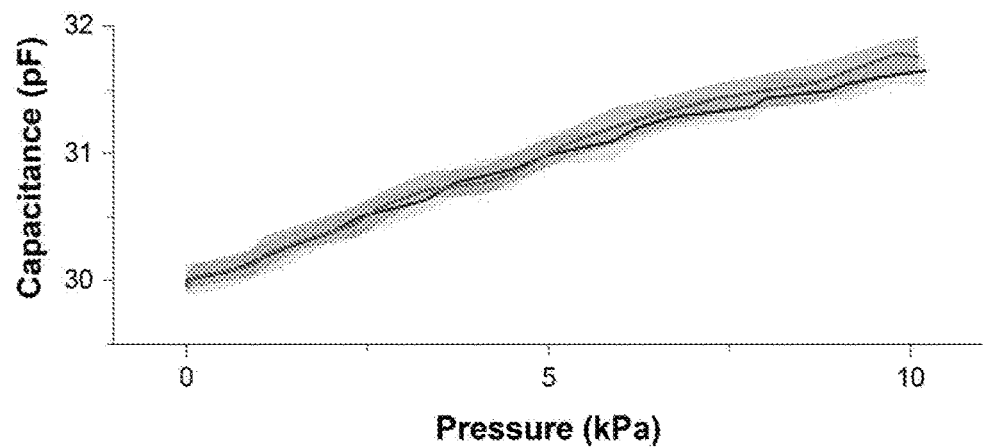

FIGS. 7A and 7B illustrate performance for such multi-modal sensing (e.g., pressure and strain) and coupling of the sensor responses. As one challenge of such multi-modal sensing is coupling of the sensor responses, in the case of electro-mechanical pressure and strain sensors, the coupling effect is amplified when both sensors structurally overlap due to working mechanism of these sensors. In this way, the applied pressure generates strain or generated strain affects pressure sensor structure, and thus its response. This is also useful in softness sensing where both pressure and strain may be measured simultaneously to infer compliance information. In certain examples as shown above such as in FIG. 2C, in order to minimize the coupling, circular opening regions may be used specifically for strain sensors; this affords opportunity to isolate both sensors for minimizing the effects of the coupling. Such a non-overlapping structural design allows decoupled sensor responses up to a certain pressure, which can be referred to as operational pressure range.

For showing multi-modal sensing operation of the compliance sensor, there are shown resistive strain sensor response (FIG. 7A) and capacitive pressure sensor response (FIG. 7A), and they may be recorded simultaneously. The strain sensor response of PDMS(25:1) as on the greater slope of FIG. 7A and glass (as on the more flat slope of FIG. 7A) has a sensitivity of 0.745 Ω/kPa and 0.118 Ω/kPa, respectively within the operational pressure range, while both have similar pressure sensor response as plotted in FIG. 7B.

In this testing associated with FIGS. 7A and 7B, the applied pressure is limited to 10 kPa (as a maximum operational pressure). The maximum operational pressure may be tailored for specific purposes, such that in general as the size of the sensor shrinks, the maximum operational pressure increases. In this case, the pressure sensor and strain sensor designs are tailored such that they provide linear response within the 0-10 kPa regime. The value 10 kPa may be chosen because it is on the order of skin's soft touch sensation. However, as the pressure goes beyond 10 kPa, due to: 1) limited gap spacing between the resistive strain sensors membrane and backing layer; 2) large deformations on the membrane yielding non-linear structural behaviors; and 3) structural and material features of the pressure sensor yielding non-linear response, it is not possible to have reliable and linear sensor responses. Due to these factors, operational pressure is limited to a certain value. After this limit, the strain sensors membrane may contact and stick to the backing surface and increased pressure does not affect the strain sensor as in the operational range. Similarly, increased loading results in decreased sensitivity in the pressure sensor response as is known and discussed in connection with previous research.

Figure 8A:
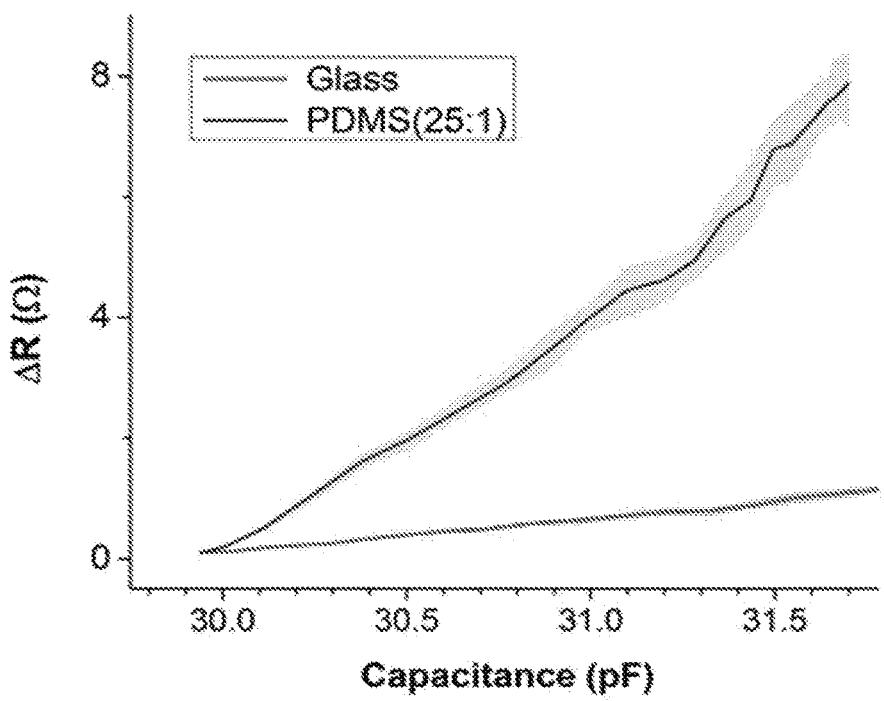
FIGS. 8A and 8B are further respective graphs showing results from experimental testing associated with an example RMB-type sensing structure with depictions of resistance and capacitance changes.
Figure 8B:
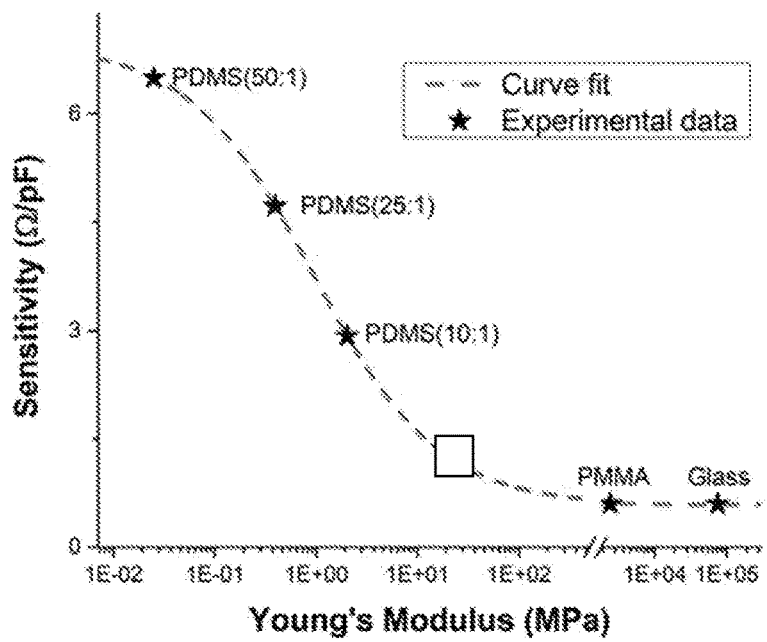

FIGS. 8A and 8B show exemplary compliance sensor output and calibration for the above type of RMB sensor. In FIG. 8A, the RMB compliance sensor outputs resistance and capacitance of strain and pressure sensors, respectively. Experimental results showing resistance and capacitance changes of the RMB sensor when tested with PDMS(25:1) and glass materials of 3 mm-thick, respectively corresponding to the greater slope and the lesser, more flat slope of FIG. 8A. Sensitivity of 4.72±0.38 Ω/pF and 0.604±0.052 Ω/pF was achieved for PDMS (25:1) and glass, respectively. In FIG. 8B, RMB sensor sensitivity versus Young's Modulus of materials is plotted. A curve was fit using the experimental values and $R^2$ of >0.99 was achieved using a symmetrical sigmoidal function $$\left(S = a + (b-a)/\left(1 + \left(\frac{x}{c}\right)^d\right)\right)$$

where a=are 6.966±0.038, b=0.702±0.013, c=0.931±0.021, and d=0.586±0.012.

Figure 9A:
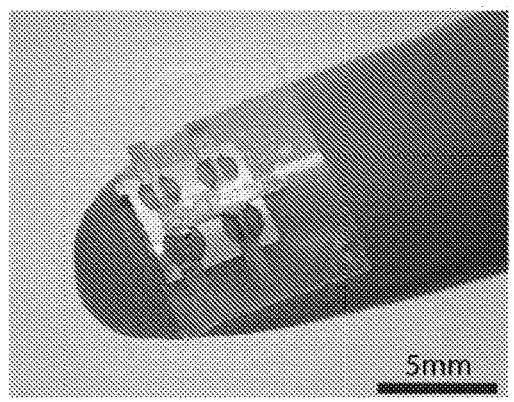
FIGS. 9A and 9B show further structure and graphs depicting results from experimental testing of one or more example sensing structures.
Figure 9B:
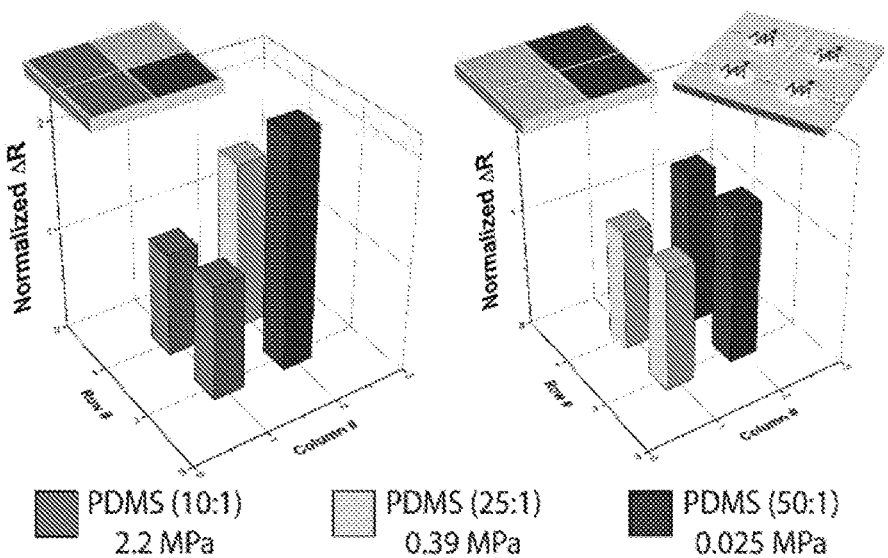

FIGS. 9A and 9B are depictions to demonstrate softness mapping using a small-sized compliance sensor as exemplified in the examples above. FIG. 9A shows a fabricated 2×2 sensor array placed on finger. FIG. 9B shows output of the strain sensor when in contacted by an object. In FIG. 9B, three (normalized resistance changes in ascending order 1.00, 1.05, 1.62, 2.18) and two different (normalized resistance changes in ascending order 1.00, 1.03, 1.28, 1.26) materials are contacted to the sensor with 10 kPa pressure.

The subset imaging illustrates the sensor and applied combination of materials with the location of the PDMS materials in identifiable by row # and column # respectively via X-and-Y axes. In the left plot of FIG. 9B, the two (red) vertical bars on the left correspond to PDMS (10:1), the darker (blue) bar on the right corresponds to PDMS (50:1), and the furthest (green) bar corresponds to PDMS (25:1). In the right plot of FIG. 9B, the two (green) vertical bars on the left correspond to PDMS (25:1), and the two darker (blue) bars on the right corresponds to PDMS (50:1). Results show normalized average resistance change (Z axis) of 10 loading cycles. Each RMB sensor pixel has a circular opening of 3 mm with aligned strain sensor of 1.5 mm long and 450 μm width at the center of the opening.

It is recognized and appreciated that as specific examples, the above-characterized figures and discussion are provided to help illustrate certain aspects (and advantages in some instances) which may be used in the manufacture of such structures and devices. These structures and devices include the exemplary structures and devices described in connection with each of the figures as well as other devices, as each such described embodiment has one or more related aspects which may be modified and/or combined with the other such devices and examples as described hereinabove may also be found in the Appendices of the above-referenced Provisional Application.

The skilled artisan would also recognize various terminology as used in the present disclosure by way of their plain meaning. As examples, the Specification may describe and/or illustrates aspects useful for implementing the examples by way of various semiconductor materials/circuits which may be illustrated as or using terms such as layers, blocks, modules, device, system, unit, controller, and/or other circuit-type depictions. Also, in connection with such descriptions, the term "source" may refer to source and/or drain interchangeably in the case of a transistor structure. Such semiconductor and/or semiconductive materials (including portions of semiconductor structure) and circuit elements and/or related circuitry may be used together with other elements to exemplify how certain examples may be carried out in the form or structures, steps, functions, operations, activities, etc. It would also be appreciated that terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed:

1. An apparatus comprising:
a strain sensor integrated with a membrane substrate;
a pressure sensor; and
a plurality of material layers ("the material layers"), stacked over one another along a plane, to integrate the strain sensor, the pressure sensor and the membrane substrate, the pressure and strain sensors to operate cooperatively to indicate, in response to a force applied to or towards the pressure sensor, characterization information of the force applied and of deformation of the membrane substrate, the characterization being based at least in part by a portion of the strain sensor being deformed by deflecting or stretching, due to the force, into a region of the material layers; and
the pressure sensor having a first subset, including at least a portion of the membrane substrate, of the material layers in a first region, and
the strain sensor having a second different subset of the material layers in a second different region that is laterally located along the plane relative to the first region, wherein the region of the material layers, into which the portion of the strain sensor is to deform, is distinct from the first region.

2. The apparatus of claim 1, wherein the strain sensor and the membrane substrate are integrated with at least one of the plurality of material layers, and at least a portion of the pressure sensor and the membrane substrate are stacked along an axis that permits sensing of the force concurrently by the strain sensor and the pressure sensor.

3. The apparatus of claim 1, wherein the membrane substrate is a stretchable membrane substrate and the strain sensor is to detect surface deformation of the stretchable membrane substrate, and the pressure sensor comprises a micro-structured elastomer that includes or is at least partly formed from at least one layer of the plurality of material layers, and wherein at least a portion of the pressure sensor and the membrane substrate are stacked along an axis that permits sensing of the force, along a direction that is normal to the axis.

4. The apparatus of claim 1, further including output circuitry, comprising at least one of circuit nodes and electrodes, coupled to the pressure and strain sensors for providing output data associated with or corresponding to the characterization information.

5. The apparatus of claim 1, further including logic circuitry to communicate with the pressure and strain sensors and, in response, to provide quantitative information, as to a magnitude of pressure applied and of the deformation via the portion of the strain sensor being stretched into the region of the material layers, useful for inferring identity of at least one material feature associated with an object used to apply the force to at least one of the plurality of material layers.

6. The apparatus of claim 1, further including compliance-sensing circuitry to infer identity, based at least in part on a magnitude of the deformation via the portion of the strain sensor being stretched into the region of the material layers, of at least one material feature, including softness, associated with a physical object used to apply the force to at least one of the plurality of material layers.

7. The apparatus of claim 1, wherein the strain sensor includes circuitry, having at least one of a resistive circuit or capacitive circuit, integrated with the plurality of material layers and configured to oppose a current's flow through the circuitry.

8. The apparatus of claim 1, wherein the pressure sensor includes circuitry, having at least one of a resistive circuit or capacitive circuit, integrated with the plurality of material layers and configured to oppose a flow of current through the circuitry in response to the applied force.

9. The apparatus of claim 1, wherein the pressure sensor includes capacitive circuitry having: a first electrode; second electrode and a dielectric material between the first electrode and the second electrode, wherein the dielectric material includes a patterned arrangement of microstructures, and the characterization information includes or is associated with a change in capacitance attributable to the applied force affecting a dimension of the microstructures.

10. The apparatus of claim 1, wherein the strain sensor includes a plurality of strain sensing regions, and wherein certain of the strain sensing regions have less flexibility than other regions of the plurality of strain sensing regions.

11. The apparatus of claim 1, wherein the strain sensor includes a plurality of regions among which are: membrane-substrate regions configured to effect flexibility in response to the applied force; and other regions that are configured to effect less flexibility than the membrane-substrate regions and that are formed at least partially by the pressure sensor.

12. The apparatus of claim 1, wherein the strain sensor includes a plurality of regions to effect different respective degrees of flexibility in the membrane substrate in response to the applied force, and wherein the pressure sensor is integrated in the plurality of material layers to effect different respective degrees of current-flow opposition in response to the applied force.

13. The apparatus of claim 1, wherein one or more of the pressure sensor and the strain sensor are configured in or formed in the plurality of material layers as part of a stacked array with at least a portion of the strain sensor being in a stacked one of the plurality of material layers that is stacked relative to at least a portion of the pressure sensor.

14. The apparatus of claim 1, wherein one or more of the pressure sensor and the strain sensor are configured in or formed of a composite material having regions with respectively different dimensions, including at least one of depth and cross-section, to manifest different flexibilities and conductivities associated with the characterization information.

15. The apparatus of claim 1, wherein at least a section of the plurality of material layers, corresponding to at least one of a portion of the membrane substrate, of the pressure sensor and a portion of the strain sensor, includes a composite material having different flexibilities and conductivities at different portions of the composite material, and wherein the composite material has an aperture formed therein and that extends from a first side of the composite material proximal towards a second side of the composite material that is opposite the first side, and has certain composite-material portions of the composite material that include aperture-proximal regions which have different degrees of flexibility than other composite-material portions of the composite material located nearer the second side of the composite material, wherein the second side is proximal to or includes at least a portion of the membrane substrate and in response to the applied force, at least a portion of the membrane substrate causes the aperture to reduce in at least one dimension toward closure of the aperture.

16. The apparatus of claim 1, wherein the pressure sensor includes at least a first electrode and the strain sensor includes a plurality of other electrodes, and wherein the strain sensor further includes a membrane substrate having an aperture and with one of the plurality of other electrodes spanning the aperture, wherein the strain sensor is to change a dimension toward closure of the aperture on one end by at least a portion of the membrane substrate.

17. The apparatus of claim 1, wherein the strain sensor further includes a first electrode and a membrane substrate, and wherein the membrane substrate is to include: another electrode; a dielectric material; and a composite material having different flexibilities and conductivity at different portions thereof; and wherein the composite material has an adjustable aperture formed on a first side of the composite material and extending toward a second side of the composite material that is opposite the first side, and the membrane substrate is to cover the adjustable aperture in a mode of operation in which the force is not applied and to reduce the adjustable aperture in another mode of operation in response to the force being applied.

18. The apparatus of claim 1, wherein the pressure sensor includes at least a first electrode, the strain sensor includes a plurality of other electrodes, and the membrane substrate includes or is immediately adjacent an aperture and with one of the plurality of other electrodes spanning the aperture, the apparatus further including at least one additional pressure sensor and at least one additional strain sensor, and wherein at least certain of the pressure sensors and/or the strain sensors are tuned or configured to respond to the applied force, in terms of and by setting one or more dimensions of: substrate thickness, material defining the aperture, one or more of the electrodes, and a gauge factor associated with lines used to form said one or more of the electrodes.

19. The apparatus of claim 1, further including circuitry to provide an indication of compliance in terms of softness of a material based on a magnitude of pressure applied and on changes, in response to the applied force, in terms of at least one of impedance and resistance exhibited by the pressure sensor and the strain sensor, and the compliance of the material is based on the deformation of the membrane substrate measured by the strain sensors and a magnitude of the applied force applied to the sensor apparatus measured by the pressure sensor.

20. The apparatus of claim 1, further including an array of membrane structures configured for strain measurement, wherein the pressure sensing includes a microstructured-pressure sensing layer, and wherein the array of membrane structures is characterized by a certain pitch distance and is to face a surface of the microstructured pressure sensing layer for gathering compliance information pertaining to softness, from different locations of an object to apply the force, and wherein the membrane substrate corresponds to one of the membrane structures in the array.

21. The apparatus of claim 1, wherein the pressure sensor and strain sensor are offset from one another, via the material layers, to permit deformation of a membrane forming part of the strain sensor into a pre-defined region or aperture and deformation of the pressure sensor outside of the pre-defined region or aperture.

22. An apparatus comprising:
a strain sensor integrated with a membrane substrate;
a pressure sensor; and
a plurality of material layers ("the material layers") to integrate the strain sensor, the pressure sensor and the membrane substrate, the pressure and strain sensors to operate cooperatively to indicate, in response to a force applied to or towards the pressure sensor, characterization information of the force applied and of deformation of the membrane substrate, the characterization being based at least in part by a portion of the strain sensor being deformed by deflecting or stretching, due to the force, into a region of the material layers, wherein the strain sensor includes a plurality of post regions to effect different respective degrees of flexibility in the membrane substrate in response to the applied force, and at least one of the plurality of post regions includes a material that is common to the membrane substrate and that has a portion adjacent to one or more respective apertures that has less flexibility than another portion of the material that is common to the membrane.

23. A method comprising:
via a plurality of material layers that integrate a strain sensor, a membrane substrate and a pressure sensor, using the strain sensor and the pressure sensor to respond to a force applied to or towards the pressure sensor; and
with the pressure and strain sensors operating cooperatively, generating characterization information of the applied force based on the pressure sensor sensing a magnitude of the applied force and based on the strain sensor sensing deformation of a portion of the membrane substrate in a direction orthogonal to a plane along which the portion of the membrane substrate is oriented,
wherein the characterization information of the applied force is generated in response to:
the strain sensor includes a plurality of post regions and effecting different respective degrees of flexibility in the membrane substrate in response to the applied force, and at least one of the plurality of post regions including a material that is common to the membrane substrate and that has a portion adjacent to one or more respective apertures that has less flexibility than another portion of the material that is common to the membrane.

24. The method of claim 23, further including, before the step of using the strain sensor and the pressure sensor to respond to the applied force, a step of molding a set of patterned silicon wafers to provide a micro-structured pyramid elastomer layer, and stacking the micro-structured pyramid elastomer layer with at least some of the plurality of material layers to face the membrane substrate, wherein the micro-structured pyramid elastomer layer acts as a dielectric in a circuit used to sense the applied pressure.

25. The method of claim 23, wherein the step of generating characterization information of the applied force is by an object and deformation of the membrane substrate occurs concurrently or simultaneously to yield compliance information of the object based at least in part on an extent of the deformation.

26. An apparatus-comprising:
a strain sensor integrated with a membrane substrate;
a pressure sensor; and
a plurality of material layers ("the material layers") to integrate the strain sensor, the pressure sensor and the membrane substrate, the pressure and strain sensors to operate cooperatively to indicate, in response to a force applied to or towards the pressure sensor, characterization information of the force applied and of deformation of the membrane substrate, the characterization being based at least in part by a portion of the strain sensor being deformed by deflecting or stretching, due to the force, into a region of the material layers, wherein the material layers are integrated with an elastic material having a composition that is tuned based on settings of a crosslinker ratio associated with a modulus of elasticity range for the elastic material.

* * * * *